(12) United States Patent
Kawai et al.

(10) Patent No.: US 7,698,020 B2
(45) Date of Patent: Apr. 13, 2010

(54) METHOD OF ESTIMATING JOINT MOMENT OF TWO-LEGGED WALKING MOBILE BODY

(75) Inventors: Masakazu Kawai, Wako (JP); Yasushi Ikeuchi, Wako (JP)

(73) Assignee: Honda Motor Co., Ltd., Tokyo (JP)

(\*) Notice: Subject to any disclaimer, the term of this patent is extended or adjusted under 35 U.S.C. 154(b) by 1130 days.

(21) Appl. No.: 10/564,069

(22) PCT Filed: Jun. 29, 2004

(86) PCT No.: PCT/JP2004/009518

§ 371 (c)(1),
(2), (4) Date: Jan. 10, 2006

(87) PCT Pub. No.: WO2005/005108

PCT Pub. Date: Jan. 20, 2005

(65) Prior Publication Data

US 2006/0195223 A1    Aug. 31, 2006

Related U.S. Application Data

(60) Provisional application No. 60/486,543, filed on Jul. 11, 2003.

(30) Foreign Application Priority Data

Sep. 11, 2003    (JP) ............................ 2003-320107

(51) Int. Cl.
*G06F 19/00* (2006.01)
(52) U.S. Cl. ........................ 700/245; 700/251; 700/255; 700/262; 318/568.11; 318/568.12; 318/568.2; 73/65.07; 901/1; 901/46; 901/50
(58) Field of Classification Search ................ 700/245, 700/255, 251, 262
See application file for complete search history.

(56) References Cited

U.S. PATENT DOCUMENTS 5,252,901 A  *  10/1993  Ozawa et al. .......... 318/568.12

(Continued)

FOREIGN PATENT DOCUMENTS

EP    1 103 451    5/2001

(Continued)

*Primary Examiner*—Khoi Tran
*Assistant Examiner*—Jonathan Sample
(74) *Attorney, Agent, or Firm*—Rankin, Hill & Clark LLP

(57) ABSTRACT

Displacements of respective joints corresponding to respective joint elements (J9 and the like) of a rigid link model (S1) representing a two-legged walking mobile body (1) are sequentially grasped. Also at the same time, values, in a body coordinate system (BC), of an acceleration vector of the origin of the body coordinate system (BC) fixed to a waist (6) as a rigid element, a floor reaction force vector acting on each leg (2), and a position vector of the point of application of the floor reaction force vector are sequentially grasped. With the use of the grasped values, joint moments respectively generated in an ankle joint (13), a knee joint (14), and a hip joint (9) of each leg (2) are sequentially estimated based on an inverse dynamics model using the body coordinate system. The estimation accuracy of the joint moments of the leg can be enhanced by reducing arithmetic processing using tilt information of the two-legged walking mobile body relative to the gravity direction as much as possible.

13 Claims, 10 Drawing Sheets

U.S. PATENT DOCUMENTS

| | | | | |
|---|---|---|---|---|
| 5,311,109 | A * | 5/1994 | Ozawa | 318/568.11 |
| 5,416,393 | A * | 5/1995 | Gomi et al. | 318/568.2 |
| 5,808,433 | A * | 9/1998 | Tagami et al. | 318/568.12 |
| 6,243,623 | B1 * | 6/2001 | Takenaka et al. | 700/245 |
| 6,943,520 | B2 * | 9/2005 | Furuta et al. | 318/568.12 |
| 2003/0018283 | A1 * | 1/2003 | Dariush | 600/595 |
| 2003/0036818 | A1 * | 2/2003 | Hattori et al. | 700/245 |
| 2003/0120388 | A1 | 6/2003 | Kuroki et al. | |
| 2003/0125839 | A1 * | 7/2003 | Takenaka et al. | 700/245 |
| 2003/0139849 | A1 * | 7/2003 | Kuroki et al. | 700/245 |
| 2004/0206164 | A1 * | 10/2004 | Kawai et al. | 73/65.07 |
| 2005/0038560 | A1 * | 2/2005 | Nagasaka | 700/245 |

FOREIGN PATENT DOCUMENTS

| | | |
|---|---|---|
| EP | 1 415 770 | 5/2004 |
| EP | 1 424 172 | 6/2004 |
| JP | 2002-346957 | 12/2002 |
| JP | 2003-089083 | 3/2003 |
| JP | 2003-117857 | 4/2003 |
| JP | 2003-117858 | 4/2003 |

* cited by examiner

METHOD OF ESTIMATING JOINT MOMENT OF TWO-LEGGED WALKING MOBILE BODY

FIELD OF THE INVENTION

The present invention relates to a method of estimating moments (joint moments) acting on respective joints of each leg of a two-legged walking mobile body such as a human being or a two-legged walking robot.

BACKGROUND ART

When controlling the operation of a walking assist device to assist a human being in making a walking motion, for example, it is necessary to grasp joint moments actually acting on the joints of the legs of the human being. The grasp of the joint moments enables an appropriate determination of a target support force of the walking assist device. Also in a two-legged walking robot, there is sometimes a need to grasp the joint moments actually acting on the joints of the legs appropriately to control its operation.

Accordingly, the applicant of the present application has earlier suggested a method of estimating joint moments of the legs of a two-legged walking mobile body such as a human being in Japanese Patent Laid-Open No. 2003-89083 (hereinafter, referred to as the patent document 1) and the like, for example. This method includes measuring displacements (rotation angles) of respective joints of the legs of the two-legged walking mobile body or an acceleration and an angular velocity of a predetermined region by using a required sensor and estimating a floor reaction force vector acting on each of the legs and a position of the point of application of the floor reaction force vector by using the measured data or a rigid link model of the two-legged walking mobile body. In this regard, the rigid link model is a model in which the structure of the two-legged walking mobile body is represented as a link body composed of a plurality of rigid elements coupled together by a plurality of joint elements. The rigid link model is used to estimate an total center-of-gravity location of the two-legged walking mobile body and the positions and postures of rigid equivalent parts (a thigh, a crus, a waist and the like) and joints (a knee joint, a hip joint, and the like) of the two-legged walking mobile body corresponding to the rigid elements and the joint elements, respectively, and is also used as a basis of a model for describing kinetic behaviors of the two-legged walking mobile body. For each of the rigid elements of the rigid link model, the weight, the length, and the center of gravity location (the position on each rigid element) are preset concomitantly.

Moreover, in the method disclosed in the patent document 1, a joint moment of a knee joint or a hip joint of each leg is estimated by arithmetic processing based on an inverse dynamics model by using an estimated floor reaction force vector, a position of the point of application of the floor reaction force vector, and the rigid link model. Generally speaking, the inverse dynamics model is a dynamic model for use in estimating a reaction force, which is an internal force of an object, or a moment, supposing that an external force acting on the object and position information have already been known (with the external force and the position information as input parameters), and represents a relation between the motion of the object (a time-series pattern of a position) and a force or a moment acting on the object. In the method of the patent document 1, the inverse dynamics model is constructed based on an equation of motion related to the motion (translational motion and rotary motion) of each rigid element of the rigid link model and the joint moments of each leg are estimated in order from a joint moment on the side of a joint closer to the point of application of the floor reaction force vector.

When estimating the joint moments as in the patent document 1, the floor reaction force vector, the point of application of the floor reaction force vector, and the inverse dynamics model need be expressed in a single coordinate system. Then, in the patent document 1, an absolute coordinate system fixed to a floor has been used as the coordinate system.

If the absolute coordinate system is used in this manner, there is a need to grasp a tilt angle in the absolute coordinate system such as, for example, a tilt angle relative to the vertical direction, of a predetermined region of the two-legged walking mobile body (more specifically, a rigid equivalent part corresponding to a certain rigid element of the rigid link model) and at the same time to transform the position and the posture of each region of the two-legged walking mobile body (a rigid equivalent part corresponding to the rigid element of the rigid link model) grasped as the relative position and posture to a certain reference region of the two-legged walking mobile body to values in the absolute coordinate system. Moreover, when calculating a floor reaction force vector or a joint moment, it is also necessary to estimate the position in the absolute coordinate system of the center of gravity of each body element of the rigid link model and thus it further requires arithmetic processing (coordinate transformation) to represent the center of gravity location in the absolute coordinate system. Accordingly, a lot of arithmetic processing such as the coordinate transformation using the tilt angle is needed.

In this case, as a method of measuring a tilt angle relative to the vertical direction of a predetermined region of the two-legged walking mobile body, there is generally known a method of integrating a detected value of a gyro sensor for detecting an angular velocity, a method of estimating a tilt angle in the form of a so-called Kalman filter by using both of the gyro sensor and the acceleration sensor, or a method of directly detecting a tilt angle using a pendulum tiltmeter. In all of these methods, however, accumulated errors involved in an integral of detected values of the gyro sensor or an inertial acceleration during the motion of the two-legged walking mobile body often inhibits a measurement of a tilt angle relative to the vertical direction with a fully satisfactory degree of accuracy in general. Therefore, it is generally hard to grasp the tilt angle of a predetermined region of the two-legged walking mobile body in the absolute coordinate system with a high degree of accuracy. Therefore, in the method of the patent document 1 requiring a lot of arithmetic processing such as coordinate transformation using the tilt angle as described above, arithmetic errors are easily accumulated, thus inhibiting an improvement of estimation accuracy of the joint moments.

The present invention has been provided in view of the above background. Therefore, it is an object of the present invention to provide a method of estimating joint moments of a two-legged walking mobile body enabling an enhancement of estimation accuracy of the joint moments of the legs by reducing arithmetic processing using tilt information relative to the gravity direction of the two-legged walking mobile body as much as possible.

DISCLOSURE OF THE INVENTION

A joint moment estimation method for a two-legged walking mobile body according to the present invention is a method of estimating a joint moment acting on at least one joint of each leg of the two-legged walking mobile body by using a rigid link model in which the two-legged walking mobile body is represented as a link body where a plurality of rigid elements are coupled together by a plurality of joint elements including at least joint elements corresponding to a hip joint and a knee joint of each leg of the two-legged walking mobile body, the method comprising: a first step of sequentially grasping displacements of the respective joints of the two-legged walking mobile body corresponding to the respective joint elements of the rigid link model; a second step of sequentially grasping values, in a body coordinate system, of an acceleration vector of the origin of the body coordinate system, which has been preset as a coordinate system fixed to one predetermined rigid element of the rigid link model, by using at least an output of an acceleration sensor attached to the two-legged walking mobile body; a third step of sequentially grasping values in the body coordinate system of a floor reaction force vector acting on each leg of the two-legged walking mobile body; a fourth step of sequentially grasping values in the body coordinate system of a position vector of a point of application of the floor reaction force vector; and a fifth step of sequentially estimating joint moments acting on at least one joint of each leg of the two-legged walking mobile body on the basis of an inverse dynamics model representing a relation between a motion of each rigid element of the rigid link model and a translational force and moment acting on the rigid element in the body coordinate system by using the displacements of the respective joints of the two-legged walking mobile body grasped in the first to fourth steps, the value of the acceleration vector of the origin in the body coordinate system, the value of the floor reaction force vector, and the value of the position vector of the point of application of the floor reaction force vector (a first invention).

According to this invention, by sequentially grasping the displacements of the joints (rotation angles or the like of the joints) of the two-legged walking mobile body corresponding to the respective joint elements of the rigid link model and sequentially grasping the value in the body coordinate system of the acceleration vector of the origin of the body coordinate system fixed to the predetermined rigid element of the rigid link model and the values in the body coordinate system of the floor reaction force vector and the position vector of the point of application of the floor reaction force vector, the joint moments can be estimated by the algorithm described mainly in the body coordinate system. More specifically, it is possible to sequentially grasp the relative positional and posture relationships of rigid equivalent parts of the two-legged walking mobile body corresponding to the respective rigid elements of the rigid link model by the displacements of the joints (equivalent to the displacements of the joint elements of the rigid link model) grasped in the first step. Thus, it is possible to sequentially grasp the positions and postures (directions) of the rigid equivalent parts of the two-legged walking mobile body (the positions and postures of the rigid elements of the rigid link model) viewed from the origin of the body coordinate system. Therefore, it is possible to sequentially grasp motion states (the position, velocity, acceleration, or other states) viewed from the origin of the body coordinate system regarding the rigid elements or the rigid equivalent parts of the two-legged walking mobile body corresponding to the rigid elements. Moreover, it becomes possible to sequentially grasp the motion states such as the acceleration of the rigid elements of the rigid link model, which accompany a general motion as a combination of a motion of the rigid equivalent part (motion to the ground) of the two-legged walking mobile body corresponding to the predetermined rigid element to which the body coordinate system is fixed and relative motions of the respective portions of the two-legged walking mobile body to the rigid equivalent part, by means of the values in the body coordinate system. The acceleration vector of the origin of the body coordinate system includes an inertial acceleration component accompanying the gravity. Thus, the motion states such as the acceleration of each rigid element of the rigid link model can be sequentially grasped by means of the values in the body coordinate system in this manner, and therefore the inverse dynamics model can be expressed in the body coordinate system by grasping the values in the body coordinate system of the floor reaction force vector and the position vector of the point of application of the floor reaction force vector in the third step and the fourth step (more specifically, a pair of coordinate component values in the body coordinate system of the floor reaction force vector and of the position vector of the point of application of the floor reaction force vector). As a result, it becomes possible to estimate the value of the floor reaction force vector in the body coordinate system, the value of the position vector of the point of application of the floor reaction force vector, the position of each rigid element, and the joint moments acting on the joints of the legs by arithmetic processing of the inverse dynamics model using the values of the motion states such as an acceleration.

As stated hereinabove, according to the present invention, the joint moments of the legs can be estimated by using the values of the motion states of the rigid elements in the body coordinate system or the rigid equivalent parts of the two-legged walking mobile body corresponding to the rigid elements, thereby enabling a reduction in arithmetic processing using the tilt information of the two-legged walking mobile body (information on a degree of tilt relative to the vertical direction or the horizontal direction of a certain region of the two-legged walking mobile body). As a result, the estimation accuracy of the joint moments of the legs can be enhanced.

Incidentally, the value in the body coordinate system of the floor reaction force vector can be grasped without the tilt information of the two-legged walking mobile body, by using the method described later. Alternatively, a load sensor (force sensor) is attached to the bottom or the like of each leg of the two-legged walking mobile body and an output of the load sensor can be used to grasp the value in the body coordinate system of the floor reaction force vector. In addition, the value of the position vector in the body coordinate system of the point of application of the floor reaction force vector can be grasped by using the tilt information of the two-legged walking mobile body as described later. On the other hand, for example, if a pressure distribution sensor is attached to the bottom (the sole of foot) of the leg of the two-legged walking mobile body, the value can be grasped without using the tilt information of the two-legged walking mobile body.

In this invention, the acceleration sensor can be attached basically to any rigid equivalent part of the two-legged walking mobile body, though it is preferably attached to the rigid equivalent part of the two-legged walking mobile body corresponding to the rigid element to which the body coordinate system is fixed (a second invention). More specifically, if the acceleration sensor is attached to a region other than the rigid equivalent part of the two-legged walking mobile body corresponding to the rigid element to which the body coordinate system is fixed, there is a need to calculate an acceleration vector of the rigid equivalent part corresponding to the rigid element to which the body coordinate system is fixed by using a displacement or the like of the joint of the two-legged walking mobile body from the acceleration vector of the attached region. On the other hand, if the acceleration sensor is attached to the rigid equivalent part corresponding to the rigid element to which the body coordinate system is fixed like the second invention, the positional relationship between the origin of the body coordinate system and the acceleration sensor is fixed and thus the value in the body coordinate system of the acceleration vector of the origin of the body coordinate system can be grasped from the output of the acceleration sensor without using the displacement of the joint of the two-legged walking mobile body. This enables an enhancement of the accuracy of the grasped value in the body coordinate system of the acceleration vector of the origin of the body coordinate system.

Moreover, in the second invention, the rigid element to which the body coordinate system is fixed is preferably a rigid element connecting a pair of joint elements corresponding to a pair of hip joints of the two-legged walking mobile body (a third invention). More specifically, the rigid element connecting the pair of joint elements corresponding to the pair of hip joints of the two-legged walking mobile body corresponds to the waist of the two-legged walking mobile body and the waist relatively less moves during walking of the two-legged walking mobile body in general. Accordingly, the output of the acceleration sensor can be relatively stabilized by reducing abrupt changes in the outputs of the acceleration sensor and it further enables an enhancement of the accuracy of the grasped value in the body coordinate system of the acceleration vector of the origin of the body coordinate system.

In the first to third inventions, the grasp of the value in the body coordinate system of the floor reaction force vector in the third step can also be achieved by using the load sensor as described above. If the two-legged walking mobile body is particularly a human being, however, the attachment of the load sensor to each leg is apt to interfere with smooth walking. Therefore, in a fourth invention, a method, for example, as described below is used to grasp the value in the body coordinate system of the floor reaction force vector.

More specifically, it includes a sixth step of sequentially calculating values in the body coordinate system of a position vector of an total center-of-gravity of the two-legged walking mobile body by using the displacements of the Joints of the two-legged walking mobile body grasped in the first step and the rigid link model; a seventh step of sequentially grasping values in the body coordinate system of the acceleration vector of the total center-of-gravity from time-series data of the value of the position vector of the total center-of-gravity and the value of the acceleration vector of the origin of the body coordinate system grasped in the second step; and an eighth step of sequentially determining whether the motion state of the two-legged walking mobile body is a one-leg supporting state in which only one leg of a pair of legs is landing or a two-leg supporting state in which both legs are landing. Then, in the third step, if the motion state of the two-legged walking mobile body is the one-leg supporting state, the value in the body coordinate system of the floor reaction force vector is estimated on the basis of the equation of motion of the total center-of-gravity of the two-legged walking mobile body represented by the value of the acceleration vector of the total center-of-gravity calculated in the seventh step, the total weight of the two-legged walking mobile body, and the floor reaction force vector acting on the landing leg. Moreover, if the motion state of the two-legged walking mobile body is the two-leg supporting state, the values in the body coordinate system of the floor reaction force vectors acting on both legs respectively are grasped on the basis of the equation of motion of the total center-of-gravity of the two-legged walking mobile body represented by the value of the acceleration vector of the total center-of-gravity calculated in the seventh step, the total weight of the two-legged walking mobile body, and the floor reaction force vectors acting on the both legs respectively and a relational expression between a relative position of a specific portion of each of the legs to the total center-of-gravity of the two-legged walking mobile body, which is determined on the assumption that the floor reaction force vector acting on the leg is a vector acting from the specific portion predetermined in the vicinity of the lower end of the leg toward the total center-of-gravity of the two-legged walking mobile body, and the floor reaction force vector acting on the leg (a fourth invention).

According thereto, the floor reaction force vector acting on the landing leg is estimated on the basis of the equation of motion of the total center-of-gravity (the equation of motion related to the translational motion of the total center-of-gravity) of the two-legged walking mobile body in both of the one-leg supporting state and the two-leg supporting state. Therefore, the floor reaction force vector can be estimated without using a load sensor, which may interfere with walking of the two-legged walking mobile body or impose a burden thereon. While the floor reaction force vector acting on each of the legs cannot be identified only by the equation of motion of the total center-of-gravity in the two-leg supporting state, the floor reaction force vector of each leg can be estimated by additionally using a relational expression between the relative position of a specific portion of the leg to the total center-of-gravity of the two-legged walking mobile body and the floor reaction force vector acting on the leg, which is determined on the assumption that the floor reaction force vector acting on each leg is a vector acting from the specific portion (for example, an ankle joint of each leg, the point of application of the floor reaction force, or the like) predetermined in the vicinity of the lower end of the leg toward the total center-of-gravity of the two-legged walking mobile body. In this case, for the acceleration vector of the total center-of-gravity of the two-legged walking mobile body, which is required in the equation of motion, its values in the body coordinate system are sequentially calculated in the seventh step. Therefore, the equation of motion of the total center-of-gravity can be described only by using the coordinate component values in the body coordinate system. Moreover, the relational expression between the relative position of the specific portion of the leg to the total center-of-gravity of the two-legged walking mobile body and the floor reaction force vector acting on the leg can be described only by using the coordinate component values in the body coordinate system. Therefore, the value of the floor reaction force vector in the body coordinate system can be calculated without grasping the tilt information (the tilt information to the vertical direction or the horizontal direction) of the two-legged walking mobile body.

In addition, with an attachment of a pressure distribution sensor at the bottom of the foot of the two-legged walking mobile body, the point of application of the floor reaction force vector can also be grasped from its detected output. It is, however, also possible to estimate the point of application in the method as described below, for example.

The method includes a ninth step of sequentially grasping tilt angles to the vertical direction of the rigid equivalent part of the two-legged walking mobile body corresponding to the rigid element to which the body coordinate system is fixed; a tenth step of determining whether or not the leg is landing for each of the legs of the two-legged walking mobile body; an 11th step of grasping at least a value in the body coordinate system of the position vector of the total center-of-gravity of the two-legged walking mobile body, a value in the body coordinate system of the position vector of the ankle joint of the landing leg, and a value in the body coordinate system of the position vector of a metatarsophalangeal joint of a foot of the leg by using the displacements of the respective joints of the two-legged walking mobile body grasped in the first step and the rigid link model; a 12th step of grasping at least the positional relationship among the total center-of-gravity, the ankle joint of the landing leg, and the metatarsophalangeal joint of a foot of the leg and the vertical position of the ankle joint of the leg on the basis of the position vector values of the total center-of-gravity, the ankle joint of the landing leg, and the metatarsophalangeal joint of the foot of the leg having been grasped and the tilt angle grasped in the ninth step; and a 13th step of estimating a horizontal in-plane position of the point of application of the floor reaction force vector acting on the landing leg on the basis of the grasped positional relationship among the total center-of-gravity, the ankle joint of the landing leg, and the metatarsophalangeal joint of the foot of the leg and estimating the vertical position of the point of application of the floor reaction force vector acting on the leg on the basis of the vertical position of the ankle joint of the leg, with the fourth step including a step of grasping a value of the position vector of the point of application of the floor reaction force vector in the body coordinate system on the basis of the horizontal in-plane position and the vertical position of the point of application of the floor reaction force vector estimated in the 13th step and the tilt angle grasped in the ninth step (a fifth invention).

More specifically, the horizontal in-plane position of the point of application of the floor reaction force vector acting on the landing leg of the two-legged walking mobile body is closely related to the relative positional relationship among the ankle joint of the leg, the metatarsophalangeal joint thereof, and the total center-of-gravity of the two-legged walking mobile body. Moreover, the vertical position of the point of application of the floor reaction force vector has a substantially constant correlation with the vertical position of the ankle joint of the leg. Accordingly, the horizontal in-plane position of the point of application of the floor reaction force vector acting on the leg can be grasped on the basis of the positional relationship among the total center-of-gravity of the two-legged walking mobile body, the ankle joint of the landing leg, and the metatarsophalangeal joint of the foot of the leg, and further the vertical position of the point of application of the floor reaction force vector acting on the leg can be grasped on the basis of the vertical position of the ankle joint of the leg. Then, the position vector of the point of application of the floor reaction force vector in the body coordinate system can be found by using the grasped horizontal in-plane position and vertical position and the tilt angle to the vertical direction of the rigid equivalent part of the two-legged walking mobile body corresponding to the rigid element to which the body coordinate system is fixed.

When estimating the position vector of the point of application of the floor reaction force in this manner, there is a need to grasp the tilt angle to the vertical direction of the rigid equivalent part of the two-legged walking mobile body corresponding to the rigid element to which the body coordinate system is fixed by using a sensor for detecting tilt angles (an angular velocity sensor or a tiltmeter). In this invention, however, the tilt angle may be used only for estimating the point of application of the floor reaction force vector, thus reducing the arithmetic operations using the tilt angle to the minimum. Therefore, even if the tilt angle has an error, the accumulation of arithmetic errors can be held to the minimum, thus securing a sufficiently high accuracy in estimating a joint moment. Moreover, the pressure distribution sensor need not be disposed at the bottom of the foot apt to receive a relatively large load instantaneously, which leads to an advantage in durability of the apparatus configuration for estimating joint moments.

The fifth invention may be used together with the fourth invention. In that case, the value calculated in the sixth step of the fourth invention may be used as the value of the position vector of the total center-of-gravity in the body coordinate system, which is required in the 11th step. Therefore, in the 10th step of the fifth invention, there is no need to calculate the value of the position vector of the total center-of-gravity in the body coordinate system anew.

In the fifth invention, if the values of the floor reaction force vector and the position vector of the point of application of the floor reaction force vector grasped in the third step and the fourth step, respectively, are three-dimensional values, the horizontal in-plane position (the position in the forward/backward direction and in the right/left direction of the two-legged walking mobile body) of the point of application of the floor reaction force vector can be grasped as described below. More specifically, the 13th step includes a step of estimating the horizontal in-plane position (the position in the forward/backward direction and in the right/left direction) of the ankle joint of the landing leg as the horizontal in-plane position (the position in the forward/backward direction and in the right/left direction) of the point of application of the floor reaction force vector acting on the leg if the total center-of-gravity is more backward than the ankle joint of the landing leg in the forward/backward direction of the two-legged walking mobile body, estimating the horizontal in-plane position (the position in the forward/backward direction and in the right/left direction) of the metatarsophalangeal joint of the foot of the landing leg as the horizontal in-plane position (the position in the forward/backward direction and in the right/left direction) of the point of application of the floor reaction force vector acting on the leg if the total center-of-gravity is more forward than the metatarsophalangeal joint of the foot of the landing leg in the forward/backward direction of the two-legged walking mobile body, and estimating the horizontal in-plane position (the position in the forward/backward direction and in the right/left direction) of the point whose position in the forward/backward is coincident with the total center-of-gravity on the line segment connecting the ankle joint with the metatarsophalangeal joint of the landing leg as a horizontal in-plane position (the position in the forward/backward direction and in the right/left direction) of the point of application of the floor reaction force vector acting on the leg if the total center-of-gravity is more forward than the ankle joint of the landing leg in the forward/backward direction of the two-legged walking mobile body and is more backward than the metatarsophalangeal joint of the foot of the leg (a sixth invention).

More specifically, if the total center-of-gravity is more backward than the ankle joint of the landing leg in the forward/backward direction of the two-legged walking mobile body, the leg is ordinarily landing with the heel of the foot of the leg and the landing point is substantially just under the ankle joint of the leg. Therefore, in this case, the horizontal in-plane position (the position in the forward/backward direction and in the right/left direction) of the ankle joint of the leg can be estimated as the horizontal in-plane position (the position in the forward/backward direction and in the right/left direction) of the point of application of the floor reaction force vector acting on the leg. If the total center-of-gravity is more forward than the metatarsophalangeal joint of the foot of the landing leg in the forward/backward direction of the two-legged walking mobile body, the leg is ordinarily landing with the toe of the foot of the leg and the landing point is substantially just under the metatarsophalangeal joint of the foot of the leg. Therefore, in this case, the horizontal in-plane position (the position in the forward/backward direction and in the right/left direction) of the metatarsophalangeal joint of the foot of the leg can be estimated as the horizontal in-plane position (the position in the forward/backward direction and in the right/left direction) of the point of application of the floor reaction force vector acting on the leg. Moreover, if the total center-of-gravity is more forward than the ankle joint of the landing leg in the forward/backward direction of the two-legged walking mobile body and is more backward than the metatarsophalangeal joint of the foot of the leg, the position of the point of application of the floor reaction force vector in the forward/backward direction is substantially the same as the position of the total center-of-gravity in the forward/backward direction. The foot can be considered to be a rigid body generally extending from the ankle joint to the metatarsophalangeal joint and therefore the point of application of the floor reaction force vector can be thought to exist on a line segment achieved by projecting a line segment connecting the ankle joint with the metatarsophalangeal joint onto the floor. Therefore, in this case, it is possible to estimate the horizontal in-plane position (the position in the forward/backward direction and in the right/left direction) of the point whose position in the forward/backward direction is coincident with the total center-of-gravity on the line segment connecting the ankle joint with the metatarsophalangeal joint of the leg as the horizontal in-plane position (the position in the forward/backward direction and in the right/left direction) of the point of application of the floor reaction force vector acting on the leg.

In the fifth or sixth invention, regarding the estimation of the vertical position of a floor reaction force acting point vector, for example, the 13th step includes a step of estimating the vertical position of the point of application of the floor reaction force vector acting on the landing leg as a position located a predetermined value apart from the vertical position of the ankle joint of the leg grasped in the 12th step downward in the vertical direction (a seventh invention). More specifically, the ankle joint of the landing leg during walking or the like of the two-legged walking mobile body is located in the position at an almost constant height above the floor surface in general. Therefore, it is possible to estimate the position located a predetermined value (a predetermined value equivalent to the above constant height) apart from the vertical position of the ankle joint of the leg downward in the vertical direction as the vertical position of the point of application of the floor reaction force vector.

The height of the ankle joint of the landing leg above the floor surface is almost constant as described above. In a situation where only the toe-side portion of the bottom face of the foot of the leg is in contact with the ground during walking of the two-legged walking mobile body, the height above the floor surface of the ankle joint of the leg increases a little in comparison with a situation where almost the total bottom face of the foot or the heel-side portion is in contact with the ground. Therefore, to increase the estimation accuracy of the vertical position of the point of application of the floor reaction force vector, it is preferable to perform the procedure described below in the seventh invention.

Specifically, in the 10th step, regarding the leg determined to be landing, it is further determined whether each of the toe-side portion and the heel-side portion of the foot of the leg is in contact with the ground. In the 12th step, the vertical position of the metatarsophalangeal joint of the foot of the leg is grasped in addition to the vertical position of the ankle joint of the landing leg. Then, in the 13th step, if only the toe-side portion is determined to be in contact with the ground among the toe-side portion and the heel-side portion of the foot in the 10th step, the vertical position of the point of application of the floor reaction force vector is estimated by using a distance in the vertical direction between the ankle joint and the metatarsophalangeal joint obtained from the vertical position of the ankle joint and the vertical position of the metatarsophalangeal joint grasped in the 12th step, instead of the predetermined value (an eighth invention).

According thereto, in the state where only the toe-side portion of the foot of the landing leg is determined to be in contact with the ground, the position located the vertical distance between the ankle joint and the metatarsophalangeal joint apart from the vertical position of the ankle joint of the leg downward in the vertical direction is estimated as the vertical position of the point of application of the floor reaction force vector. As a result, the estimation accuracy can be increased in the vertical position of the point of application of the floor reaction force vector.

In the inventions described hereinabove, the value of the floor reaction force vector and the value of the position vector of the point of application of the floor reaction force vector respectively grasped in the third step and the fourth step are preferably three-dimensional values (a ninth invention). According thereto, the value of the floor reaction force vector and the value of the position vector of the point of application of the floor reaction force vector are grasped according to spatial behaviors of the two-legged walking mobile body, thereby increasing the estimation accuracy of the joint moments estimated based on them.

BEST MODE FOR CARRYING OUT THE INVENTION

A preferred embodiment of the present invention will now be described hereinafter with reference to FIG. 1 to FIG. 10.

Figure 1:
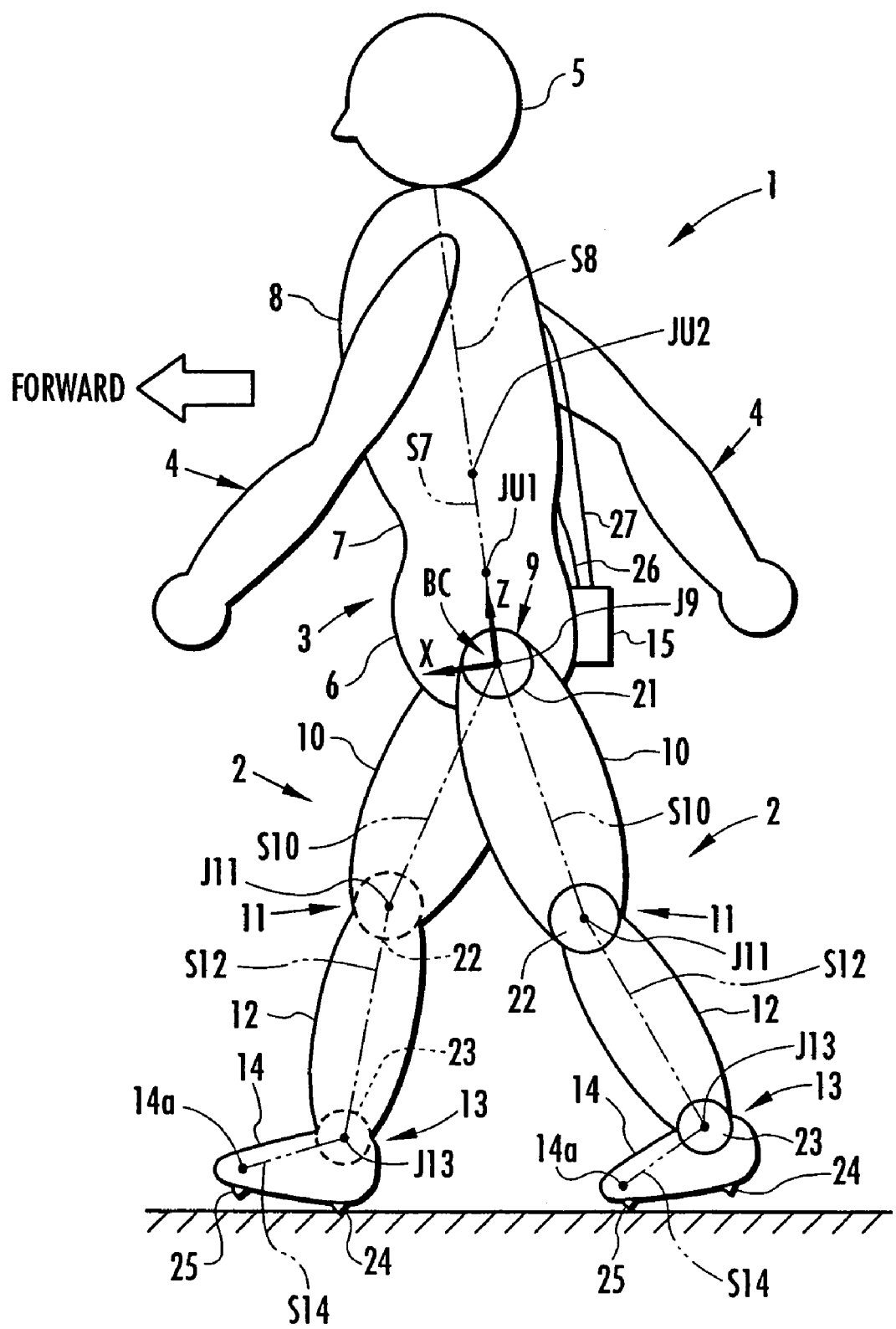
FIG. 1 is a diagram typically showing a general apparatus configuration in an embodiment to which the present invention is applied to a human being as a two-legged walking mobile body.
Figure 2:
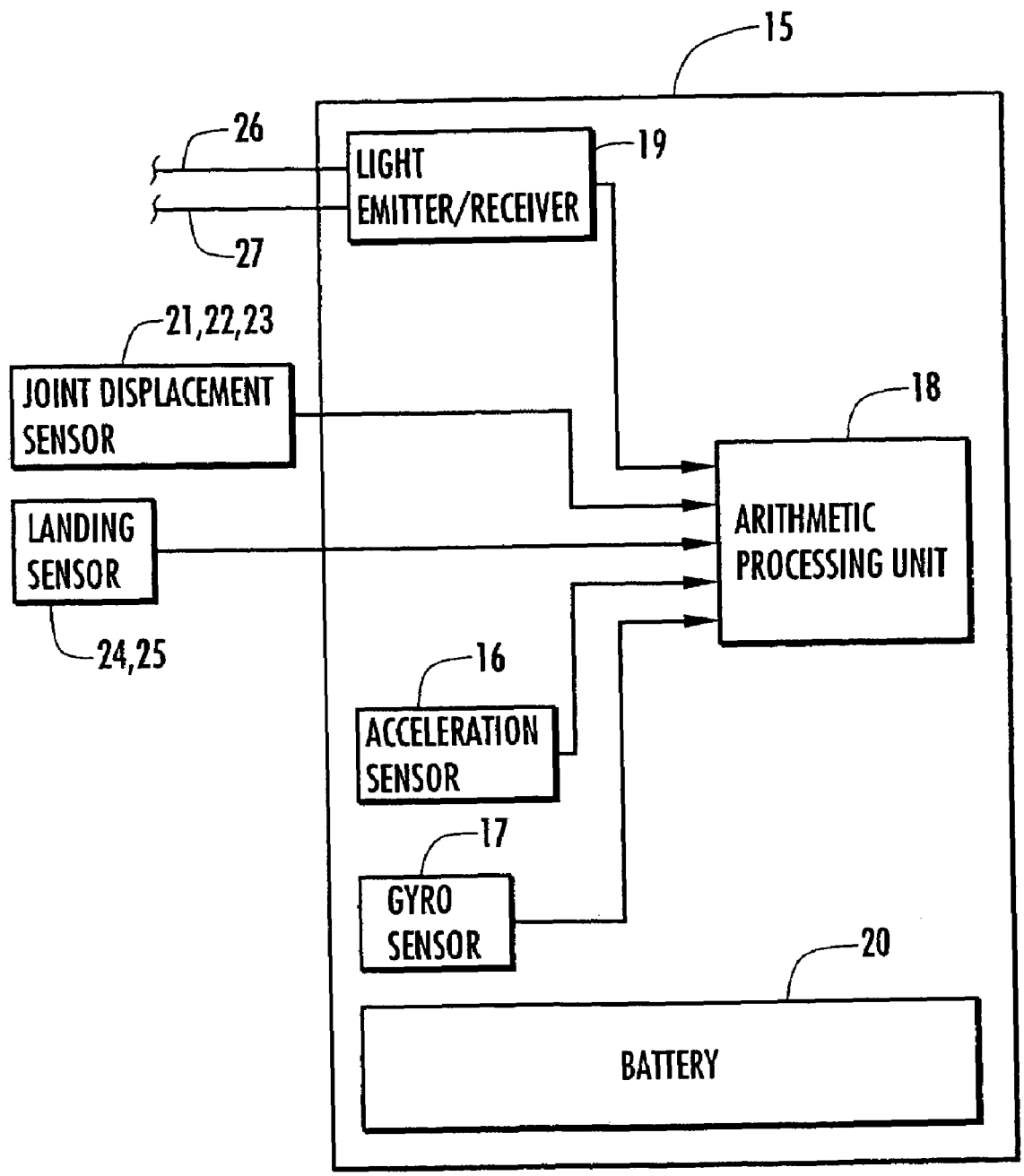
FIG. 2 is a block diagram showing the configuration of a sensor box provided in the apparatus shown in FIG. 1.

Referring to FIG. 1, there is typically shown a diagram of a general apparatus configuration in an embodiment to which the present invention is applied to a human being as a two-legged walking mobile body. As shown in FIG. 1, the human being 1 has a structure generally classified into a pair of right and left legs 2, 2, a body 3, a pair of right and left arms 4, 4, and a head 5. The body 3 is composed of a waist 6, an abdomen 7, and a chest 8. The waist 6 is coupled to the legs 2, 2 via a pair of right and left hip joints 9, 9 so as to be supported on the both legs 2, 2. Moreover, the arms 4, 4 are extended from the right and left sides of the chest 8 of the body 3 and the head 5 is supported on the upper end of the chest 8. The each leg 2 has a thigh 10 extending from the hip joint 9, a crus 12 extending from the end of the thigh 10 via a knee joint 11, and a foot 14 extending from the end of the crus 12 via an ankle joint 13.

In this embodiment, the human being 1 is equipped with an apparatus as described below to estimate joint moments acting on the joints 9, 11, and 13 of the each leg 2 of the human being 1 having the above structure. More specifically, a sensor box 15 is attached to the back of the waist 6 via a member such as a belt, which is not shown. The sensor box 15 contains an acceleration sensor 16 for detecting an acceleration (a translational acceleration) in the 3-axis direction, a gyro sensor 17 for detecting an angular velocity in the 3-axis direction (around 3 axes), an arithmetic processing unit 18 configured by using a microcomputer, a light emitter/receiver 19 for emitting a light to be introduced into optical fibers 26, 27 described later or receiving a feedback light, and a battery 20 as a power supply for each electrical equipment such as the arithmetic processing unit 18, as shown in the block diagram of FIG. 2. The acceleration sensor 16 and the gyro sensor 17 are fixed to the waist 6 via the sensor box 15 so as to move integrally with the waist 6.

Joint displacement sensors 21, 22, and 23 for detecting displacements of the respective joints are attached to the regions of the hip joint 9, the knee joint 11, and the ankle joint 13 of the each leg 2 via a member such as a belt, which is not shown. The displacements detected by the joint displacement sensors 21, 22, and 23 are rotation angles around three axes of the joints 9, 11, and 13 and they are detected by using a potentiometer or the like.

Two landing sensors 24 and 25 are provided on the bottom face of the foot 14 of the each leg 2 (more specifically, the bottom face of a shoe put on the foot 14). Among the landing sensors 24 and 25, the landing sensor 24 is disposed in a place (heel) just under the ankle joint 13 and the landing sensor 25 is disposed in a place (toe) just under the metatarsophalangeal joint 14a of the foot 14 (a joint at the root of the big toe of the foot 14). These landing sensors 24, 25 are sensors outputting ON/OFF signals indicating whether the parts where they are disposed are in contact with the ground. Incidentally, detected outputs from the joint displacement sensors 21, 22, 23 and the landing sensors 24, 25 are input to the arithmetic processing unit 18 of the sensor box 15 via signal lines (not shown).

As shown in FIG. 1, two optical fibers 26, 27 are extended upward from the sensor box 15 along the back face of the body 3 and their points are fixed to the back face of the abdomen 7 and the back face of the chest 8, respectively, via a belt or other member not shown. The optical fibers 26, 27 are components of detection means for detecting tilt angles (tilt angles on a sagittal plane) of the abdomen 7 and the chest 8, respectively, relative to the waist 6. The tilt angles of the abdomen 7 and the chest 8 are measured by using the optical fibers 26, 27 in the method described below. The method of measuring the tilt angle of the abdomen 7 using the optical fiber 26 will now be typically described. A light having a predetermined intensity is introduced from the light emitter/receiver 19 (shown in FIG. 2) disposed in the sensor box 5 into the optical fiber 26 and the introduced light is reflected at the end of the optical fiber 26 and returns to the sensor box 15 side. The light emitter/receiver 19 then detects the feedback amount of the light (the intensity of the feedback light). The optical fiber 26 is provided with a plurality of notches (not shown) allowing subtle light leakage disposed at intervals in the longitudinal direction. Therefore, light of the amount according to the tilt angle of the abdomen 7 relative to the waist 6 leaks from the optical fiber 26 via the notches, out of the light introduced into the optical fiber 26. Therefore, the feedback amount of the light to the sensor box 15 side depends upon the tilt angle of the abdomen 7 and the tilt angle of the abdomen 7 relative to the waist 6 is measured by detecting the feedback amount. In other words, the detected outputs of the light emitter/receiver 19 according to the feedback amount of the light of the optical fiber 26 depends upon the tilt angle of the abdomen 7 relative to the waist 6 and it is input to the arithmetic processing unit 18 as a signal indicating the tilt angle. The same applies to the method of measuring the tilt angle of the chest 8 using the optical fiber 27.

The rotation angles of the hip joint 9, the knee joint 11, and the ankle joint 13 detected by the joint displacement sensors 21, 22, and 23 are measured with reference (zero point) to a condition where the human being 1 stands up with a standing posture (the condition is hereinafter referred to as the reference posture condition of the human being 1) with feet 14, 14 directed forward in parallel to each other. The same applies to the tilt angles of the abdomen 7 and the chest 8 detected by using the optical fibers 26, 27.

Figure 3:
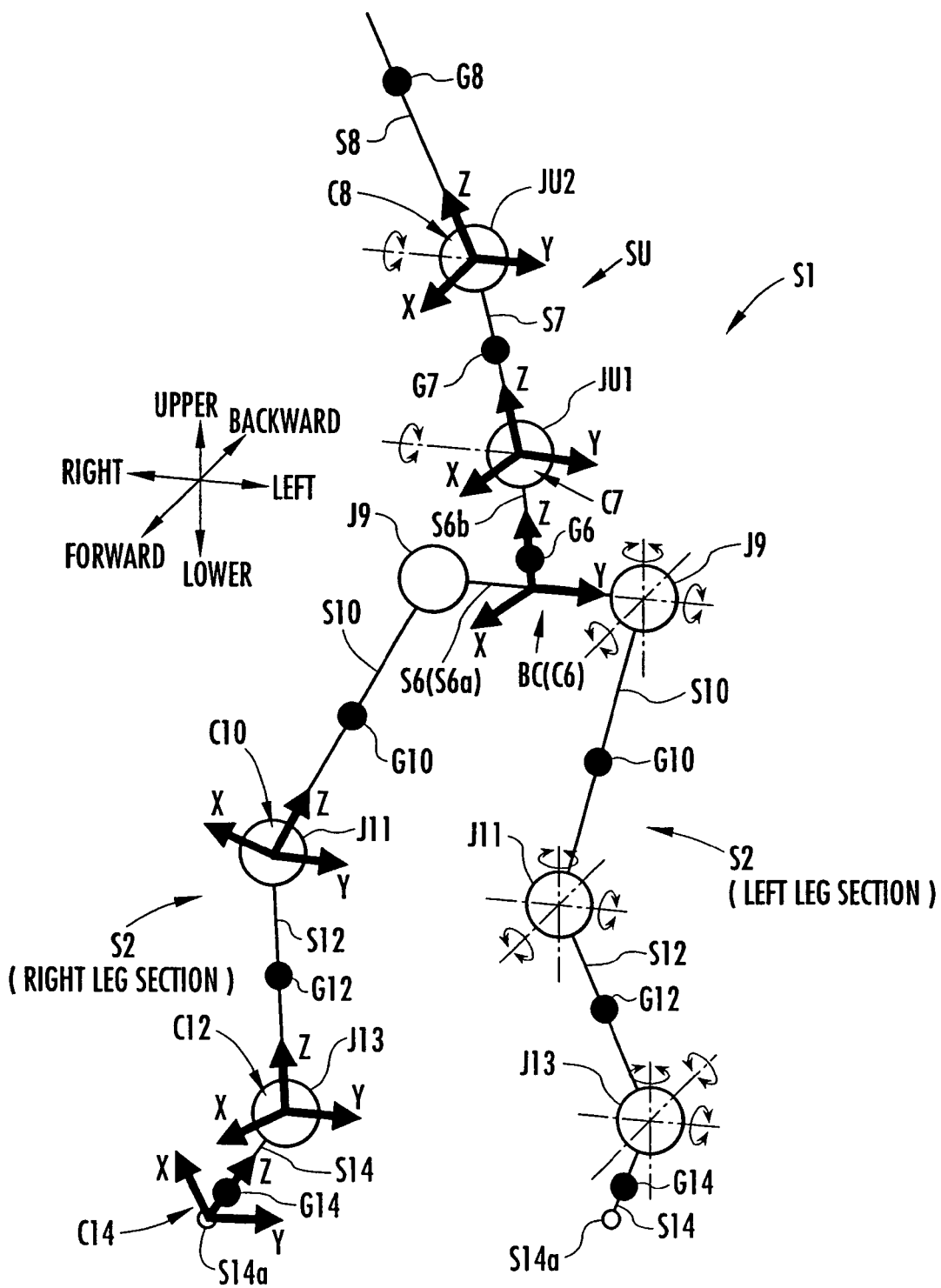
FIG. 3 is a perspective view of a rigid link model for use in the embodiment.

Here, the description is given to the rigid link model of the human being 1 and the coordinate system used in this embodiment. Referring to FIG. 3, there are shown the rigid link model S1 and the coordinate system. The rigid link model S1 is also shown in FIG. 1 by using a virtual line. In this embodiment, the rigid link model S1 represents the human being 1 as a link body composed of nine rigid elements and eight joint elements. More specifically, the rigid link model S1 is roughly composed of a pair of leg sections S2, S2 corresponding to the legs 2, 2 of the human being 1 and an upper body SU corresponding to the upper part of the body (the part above the waist 6) of the human being 1. The upper body SU is a link body composed by coupling a rigid element S6 corresponding to the waist 6 of the human being 1 and a rigid element S7 corresponding to the abdomen 7 via a joint element JU1 and further coupling a rigid element S7 to a rigid element S8 corresponding to the chest 8 via a joint element JU2. Hereinafter, the rigid elements S6, S7, and S8 are referred to as the waist element S6, the abdomen element S7, and the chest element S8, respectively, and the joint elements JU1 and JU2 are referred to as the lower joint of the upper body JU1 and the upper joint of the upper body JU2, respectively, in some cases.

In this instance, the waist element S6 is in the form of inverted T shape. The lower joint of the upper body JU1 is disposed at the upper end of the waist element S6 and a pair of joint elements J9, J9 corresponding to the pair of hip joints 9, 9 (hereinafter, simply referred to as the hip joint J9 in some cases) of the human being 1 at the horizontal ends of the waist element S6. In other words, the waist element S6 is composed of a portion S6a extending in the direction of a line segment connecting the centers of the hip joints J9, J9 therebetween (right/left direction) and a portion S6b extending substantially upward from the center of the portion S6a toward the lower joint of the upper body JU1. In this regard, the lower joint of the upper body JU1 corresponds to a joint supposed on the backbone of the human being 1 in the vicinity of the border between the waist 6 and the abdomen 7 of the human being 1, and the upper joint of the upper body JU2 corresponds to a joint supposed on the backbone of the human being 1 in the vicinity of the border between the abdomen 7 and the chest 8. Although an actual backbone controlling the bending motion of the body 3 of the human being 1 is composed of a lot of joints, in the rigid link model S1 the bending motion of the upper body SU is made by two joint elements of the lower joint of the upper body JU1 and the upper joint of the upper body JU2. Then, the abdomen element S7 is extending in the direction of a line segment connecting the centers of the lower joint of the upper body JU1 and the upper joint of the upper body JU2 therebetween. The chest element S8 is assumed to be extending from the upper joint of the upper body JU2 to the root of the neck of the human being 1 (more specifically, the region on the backbone in the vicinity of the border between the body 3 and the neck) as shown in FIG. 1.

The each leg section S2 of the rigid link model S1 is configured as a link body wherein a rigid element S10 corresponding to the thigh 10 is coupled to the waist element S6 via the hip joint J9, a rigid element S12 corresponding to the crus 12 is coupled to the rigid element S10 via a joint element J11 corresponding to the knee joint 11, and a rigid element S14 corresponding to the foot 14 is coupled to the rigid element S12 via a joint element J13 corresponding to the ankle joint 13. Hereinafter, the rigid elements S10, S12, and S14 are simply referred to as the thigh element S10, the crus element S12, respectively, and the foot element S14 and the joint elements J11 and J13 are simply referred to as the knee joint J11 and the ankle joint J13, respectively, in some cases.

In this instance, the thigh element S10 and the crus element S12 are each extending in the direction of a line segment connecting the centers of the joint elements between the joint elements at the both ends of each of them. Moreover, the foot element S14 has a tip that corresponds to a metatarsophalangeal joint 14a of the foot 14 of the human being 1 and is extending from the ankle joint 13 (J13) to the metatarsophalangeal joint 14a (hereinafter, referred to as the MP joint 14a) of the foot 14 as shown in FIG. 1. In the rigid link model S1, the tip of the foot element S14 does not have a function of a joint, but hereinafter the tip is referred to as the MP joint J14a for convenience in some cases.

The rigid elements and the joint elements of the rigid link model S1 configured as described above are capable of making motions in such a way that the mutual positional and posture relationships (directional relationships) are substantially coincident with the mutual positional and posture relationships of the portions of the human being 1 corresponding to the rigid elements and the joint elements by means of the rotary motions of the joint elements. In this instance, the lower joint of the upper body JU1 and the upper joint of the upper body JU2 are assumed to be capable of rotating around three axes. By using one of the three axes as a measurement axis, a rotation around the measurement axis (See arrows (rotation arrows) corresponding to the joint elements JU1, JU2 shown in FIG. 3) is measured. In this embodiment, the measurement axis is parallel to a line segment connecting the centers of the pair of hip joints J9, J9 (in the direction in which the portion S6a of the waist element S6 is extending). The hip joint J9, the knee joint J11, and the ankle joint J13 of the each leg section S2 are assumed to be rotatable around three axes as indicated by arrows (rotation arrows) typically shown in FIG. 3 regarding the joint elements J9, J11, and J13 of the left leg section S2.

Figure 5:
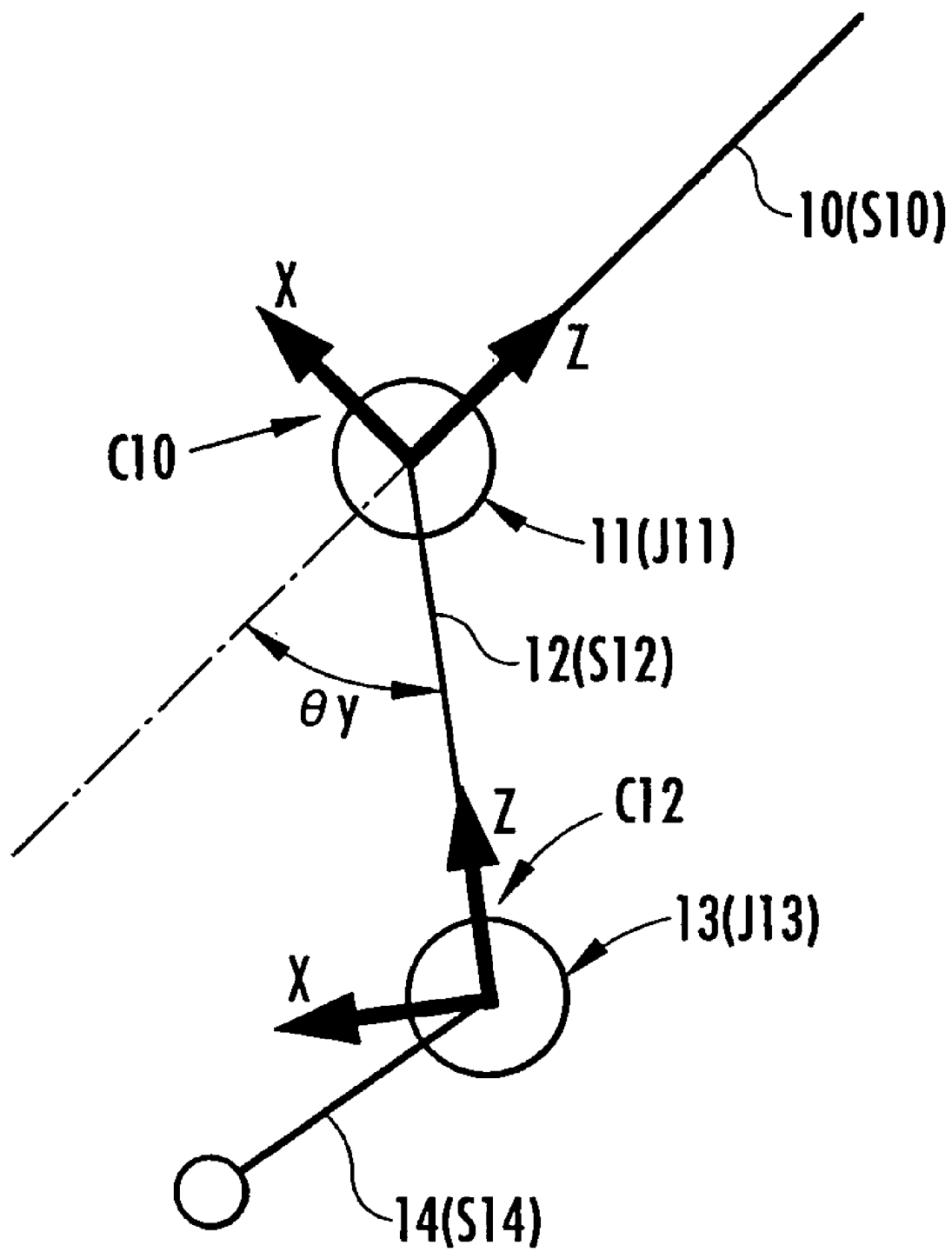
FIG. 5 is a diagram for explaining an example of a transformation tensor of a coordinate transformation for use in the embodiment.

In the rigid link model S1, the weight, the length (the length in the central axis direction) of the each rigid element and the center of gravity location of the each rigid element (the position in the rigid element) are predetermined and then stored in a memory, not shown, in the arithmetic processing unit 18. Black dots G8, G7, G6, G10, G12, and G14 shown in FIG. 5 illustratively indicate the centers of gravity of the chest element S8, the abdomen element S7, the waist element S6, the thigh element S10, the crus element S12, and the foot element S14, respectively. The waist element S6 is in the form of inverted T shape as described above, and therefore the length of the waist element S6 includes the length of the portion S6a and that of the portion S6b.

The weight, the length, and the center of gravity location of the each rigid element are basically set so as to be substantially coincident with the weight, the length, and the center of gravity location of a rigid equivalent part of the human being 1 corresponding to the each rigid element. For example, the weight, the length, and the center of gravity location of the thigh element S10 are substantially the same as the actual weight, length, and center of gravity of the thigh 10 of the human being 1. It should be noted that the weight and the center of gravity location are those in the state where the human being 1 is equipped with the apparatus of this embodiment. The weight and the center of gravity location of the chest element S8 are the weight and the center of gravity location of the part including the chest 8, both arms 4, 4, and the head 5 of the human being 1. Additionally speaking, the change in the center of gravity location of the chest element S8 accompanying the motion of the both arms 4, 4 (the motion of swinging the arms back and forth) of the human being 1 during walking is relatively small and therefore the center of gravity location is maintained at a substantially fixed position of the chest element S8. The center of gravity location of the each rigid element is set with the each coordinate component value of the element coordinate system as a position vector in the element coordinate system, which is described later, fixedly preset to the each rigid element.

While the weight, the length, and the center of gravity location of the each rigid element may be basically determined based on the actual measurements of the size or the weight of each part of the human being 1, it is also possible to estimate them on the basis of average statistical data of a human being from the height and the weight of the human being 1. In general, the center of gravity location, the weight, and the length of the rigid equivalent part of the human being 1 corresponding to the each rigid element have a correlation with the height and the weight (the total weight) of a human being, and it is possible to estimate the center of gravity location, the weight, and the length of the rigid equivalent part of the human being 1 corresponding to the each rigid element relatively accurately from measurement data of the height and the weight of the human being 1 on the basis of the correlation.

While the centers of gravity G8, G7, G6, F10, G12, and G14 are shown in such a way as to be located on the central axis of the rigid elements corresponding to them respectively in FIG. 3 for convenience, they are not necessarily located on the central axis, but can exist in the positions deviating from the central axis.

In this embodiment, a coordinate system as described below is preset for the rigid link model S1. More specifically, as shown in FIG. 3, the body coordinate system BC is set with being fixed to the waist element S6. The body coordinate system BC is established as a three-dimensional coordinate system (XYZ coordinate system) whose origin is defined as being the midpoint of a line segment between the centers of the pair of hip joints J11, J11 (the center point of the portion S6a of the waist element S6), whose Y axis is defined as being in the direction of the line segment, whose Z axis is defined as being in the direction from the origin to the center of the lower joint of the upper body JU1, and whose X axis is defined as being in the direction perpendicular to the Y axis and the Z axis. In the reference posture condition of the human being 1, the X axis, the Y axis, and the Z axis of the body coordinate system BC are oriented in the forward/backward direction, the right/left direction, and the vertical direction of the human being 1, respectively, and the XY plane is a horizontal plane.

Moreover, an element coordinate system is fixedly set at the each rigid element as indicated by the reference characters C8, C7, C6, C10, C12, or C14, for example. In this embodiment, the element coordinate system C6 of the waist element S6 is defined as being coincident with the body coordinate system BC. Moreover, the element coordinate systems C8, C7, C10, C12, and C14 of the chest element S8, the abdomen element S7, the each thigh element S10, the each crus element S12, and the each foot element S14 are defined as being three-dimensional coordinate systems (XYZ coordinate systems) whose origins are at the respective centers of the upper joint of the upper body JU2, the lower joint of the upper body JU1, the knee joint J11, the ankle joint J13, and the MP joint J14. In other words, regarding the each leg section S2, the element coordinate systems C10, C12, and C14 of the rigid elements S10, S12, and S14 are each set with the origin at the center of the joint element on the farther side from the waist element S6 of the joint elements at both ends of each of the rigid elements S10, S12, and S14. Furthermore, the element coordinate systems C7 and C8 of the abdomen element S7 and the chest element S8 of the upper body SU are each set with the origin at the center of the joint element on the closer side to the waist element S6 of the joint elements at both ends of each of the abdomen element S7 and the chest element S8. Although the element coordinate systems C10, C12, and C14 are shown only regarding the right leg section S2 in FIG. 3 for convenience of illustration, the element coordinate systems are also set for the left leg section S2, similarly to the right leg section S2.

Moreover, the element coordinate systems C8 and C7 are set with the Z axis in the extending direction (the central axis direction) of the chest element S8 and the abdomen element S7, respectively, and with the Y axis in the same direction as the Y axis of the body coordinate system BC. The element coordinate systems C10, C12, and C14 are set with the Z axis in the extending direction (the central axis direction) of the thigh element S10, the crus element S12, and the foot element S14, respectively, and with the Y axis in the normal line direction of a plane including the respective centers of the hip joint J9, the knee joint J11, and the ankle joint J13 (hereinafter, referred to as a leg plane in some cases). In all element coordinate systems C8, C7, C10, C12, and C14, the X axis is set in the direction perpendicular to the Y axis and the Z axis. In the following description, the element coordinate systems C8, C7, C6, C10, C12, and C14 are referred to as the chest coordinate system C8, the abdomen coordinate system C7, the waist coordinate system C6, the thigh coordinate system C10, the crus coordinate system C12, and the foot coordinate system C14, respectively, in some cases.

The element coordinate systems C8, C7, C10, C12, and C14 need not be necessarily set as described above, but basically can be set with an arbitrary origin or arbitrary directions of axes.

Figure 4:
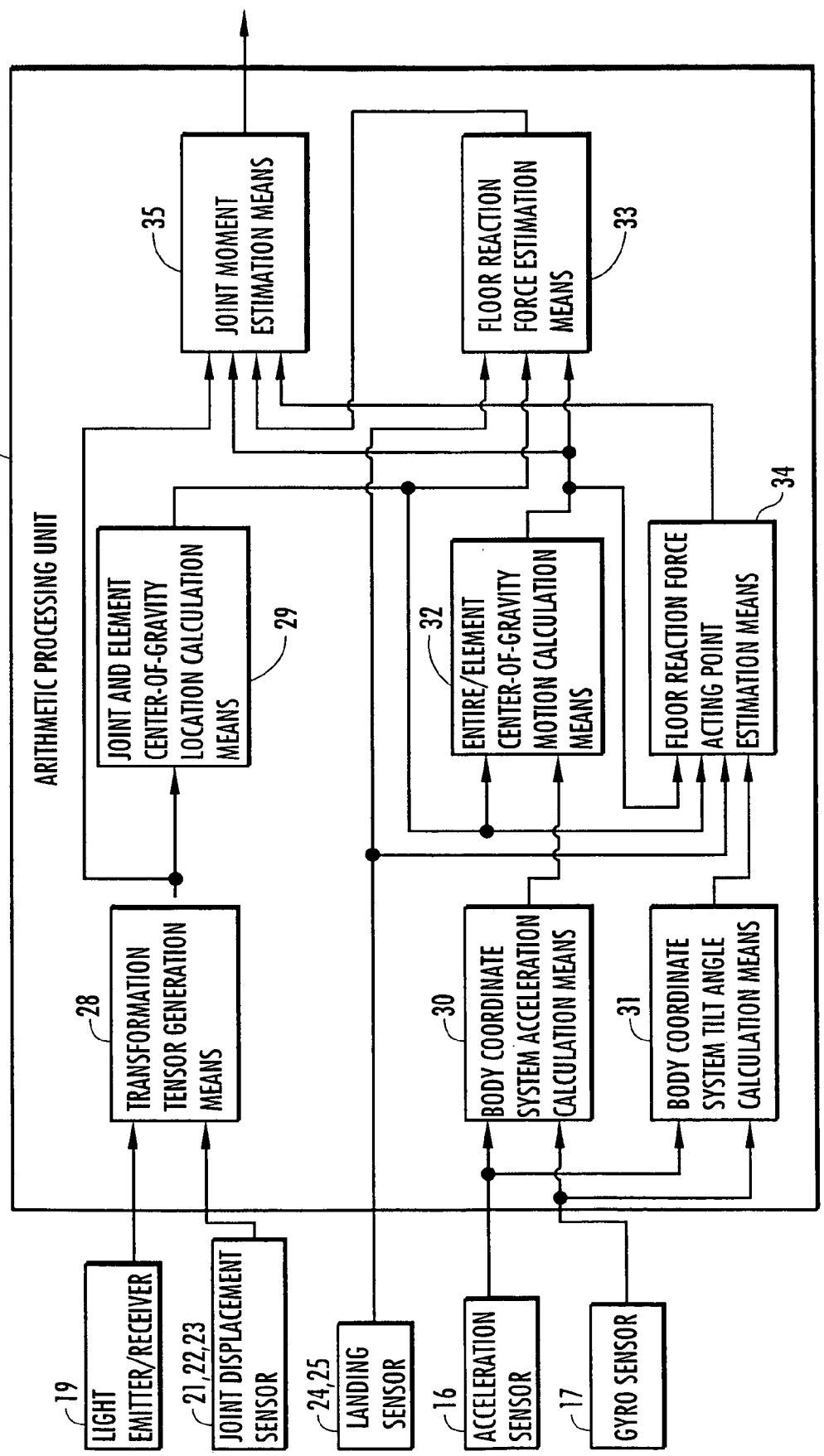
FIG. 4 is a block diagram showing functional means of the arithmetic processing unit shown in FIG. 2.

FIG. 4 is a block diagram showing the arithmetic processing functions of the arithmetic processing unit 18. As shown in this diagram, the arithmetic processing unit 18 includes: transformation tensor generation means 28 for generating a transformation tensor for use in a coordinate transformation described later on the basis of detected outputs of the joint displacement sensors 21, 22, and 23 and the light emitter/receiver 19; joint and element center-of-gravity location calculation means 29 for calculating values (coordinate component values) of the position vectors in the body coordinate system BC of the joint elements and the centers of gravity of the rigid elements of the rigid link model S1 by using the transformation tensor; body coordinate system acceleration calculation means 30 for calculating a value (a coordinate component value in the body coordinate system BC) of the acceleration vector (translational acceleration) of the origin of the body coordinate system BC on the basis of detected outputs of the acceleration sensor 16 and the gyro sensor 17; and body coordinate system tilt angle calculation means 31 for calculating a tilt angle to the vertical direction of the body coordinate system BC on the basis of detected outputs of the acceleration sensor 16 and the gyro sensor 17.

Moreover, the arithmetic processing unit 18 includes total/element center-of-gravity motion calculation means 32 for calculating a value of the position vector of the total center-of-gravity (the total center-of-gravity of the human being 1) of the rigid link model S1 in the body coordinate system BC by using the values of the position vectors of the centers of gravity of the rigid elements calculated by the joint and element center-of-gravity location calculation means 29 and for calculating a value (a coordinate component value in the body coordinate system BC) of the acceleration vector (translational acceleration) of the total center-of-gravity by using the time-series data of the value of the position vector and the value of the acceleration vector of the origin of the body coordinate system BC calculated by the body coordinate system acceleration calculation means 30. The total/element center-of-gravity motion calculation means 32 also calculates values (coordinate component values in the body coordinate system BC) of the acceleration vectors (translational accelerations) of the centers of gravity of the thigh element S10, the crus element S12, and the foot element S14 by using the time-series data of the values of the position vectors of the centers of gravity of the thigh element S10, the crus element S12, and the foot element S12 calculated by the joint and element center-of-gravity location calculation means 29 and the value of the acceleration vector of the origin of the body coordinate system BC calculated by the body coordinate system acceleration calculation means 30.

Furthermore, the arithmetic processing unit 18 includes: floor reaction force estimation means 33 for estimating a value (a coordinate component value) in the body coordinate system BC of the floor reaction force vector (translational floor reaction force) acting on the legs 2, 2 of the human being 1 by using the value of the position vector of each of the ankle joints J13 calculated by the joint and element center-of-gravity location calculation means 29, the value of the position vector of the total center-of-gravity and the value of its acceleration vector calculated by the total/element center-of-gravity motion calculation means 32, and the detected outputs of the landing sensors 24, 25; and floor reaction force acting point estimation means 34 for estimating a value (a coordinate component value) in the body coordinate system BC of the position vector of an acting point of the floor reaction force vector acting on each leg 2 (hereinafter, simply referred to as the floor reaction force acting point) by using the values of the position vectors of the each ankle joint J13 and the each MP joint J14a calculated by the joint and element center-of-gravity location calculation means 29, the tilt angle of the body coordinate system BC calculated by the body coordinate system tilt angle calculation means 31, the value of the position vector of the total center-of-gravity calculated by the total/element center-of-gravity motion calculation means 32, and the detected outputs of the landing sensors 24, 25.

Moreover, the arithmetic processing unit 18 includes joint moment estimation means 35 for estimating joint moments acting on the ankle joint 13, the knee joint 11, and the hip joint 9 of the each leg 2 by using the transformation tensor generated by the transformation tensor generation means 28, the acceleration vectors of the centers of gravity of the thigh element S10, the crus element S12, and the foot element S14 calculated by the total/element center-of-gravity motion calculation means 32 the value of the floor reaction force vector estimated by the floor reaction force estimation means 33, and the value of the position vector of the floor reaction force acting point estimated by the floor reaction force acting point estimation means 34.

Although the details are described later, the arithmetic processing unit 18 sequentially performs the arithmetic processing of the aforementioned means 28 to 35 each for a predetermined arithmetic processing period and finally calculates estimated values of the joint moments sequentially by using the joint moment estimation means 35 in each arithmetic processing period.

Subsequently, the operation of the apparatus in this embodiment will be described in conjunction with detailed arithmetic processing of the respective means of the arithmetic processing unit 18. In the following description, generally the transformation tensor for coordinate-transforming a vector quantity from a certain coordinate system Ca to another coordinate system Cb, namely, a tensor for transforming a vector quantity represented by a component value of the coordinate system Ca to a vector quantity represented by a component value of the coordinate system Cb is denoted by R(Ca→Cb). Furthermore, a position vector of a point P or a region P viewed on the coordinate system Ca is denoted by U(P/Ca). Still further, a vector A of an applied force, an acceleration, or other physical quantity of an object Q or a region Q, which is represented by a coordinate component value of the coordinate system Ca is denoted by A(Q/Ca). In this case, when representing a coordinate component value on the coordinate system Ca of the position vector U(P/Ca) or the physical quantity vector A(Q/Ca), the name of each coordinate axis x, y, or z is added in the denotation. For example, the X coordinate component of the position vector U(P/Ca) is denoted by U(P/Ca)x.

Moreover, the element coordinate systems C8, C7, C6, C10, C12, and C14 are sometimes referred to as C_chest, C_abdomen, C_waist, C_thigh, C_crus, and C_foot by using the names of the regions corresponding to them, respectively. It is assumed that the same applies to the rigid elements S8, S7, S6, S10, S12, and S14 and the centers of gravity G8, G7, G6, G10, G12, and G14 of the rigid elements S. For example, the waist element S8 and its center of gravity G8 are sometimes denoted by S_waist and G_waist, respectively. Regarding denotations related to the thigh 10, the crus 12, and the foot 14, "right" or "left" is further added in the denotation if the difference between right and left need be indicated. For example, the right thigh element S10 is sometimes referred to as an S_right thigh. Moreover, the hip joint J9, the knee joint J11, the ankle joint J13, and the MP joint J14a are sometimes referred to as J_hip, J_knee, J_ankle, and J_MP, respectively. If there is a need to indicate the difference between right and left, the term "right" or "left" is further added in the denotation similarly to the above.

The arithmetic processing unit 18 accepts detected outputs of the joint displacement sensors 21, 22, and 23, the light emitter/receiver 19, the acceleration sensor 16, and the gyro sensor 17 via an A/D converter, which is not shown, and accepts detected outputs (ON/OFF signals) of the landing sensors 24, 25 each in a predetermined arithmetic processing period. It then sequentially performs the arithmetic processing of the transformation tensor generation means 28 and the joint and element center-of-gravity location calculation means 29, first.

The arithmetic processing of the transformation tensor generation means 28 includes generating a transformation tensor for performing a coordinate transformation of a vector quantity between each element coordinate system and the body coordinate system BC. The transformation tensor is generated in the procedure described below. First, rotation angles (rotation angles around three axes) of the hip joint 9, the knee joint 11, and the ankle joint 13 of the each leg 2 are grasped as rotation angles of the hip joint J9, the knee joint J11, and the ankle joint J13 of the rigid link model S1 on the basis of the detected outputs of the joint displacement sensors 21, 22, and 23, and the tilt angles of the abdomen element S7 and the chest element S8 relative to the waist element M6 of the rigid link model S1 (specifically, the tilt angles on the sagittal plane (XZ plane) relative to the Z axis direction of the waist element coordinate system C6) are grasped on the basis of the detected outputs of the light emitter/receiver 19. Then, the transformation tensor for coordinate-transforming a vector quantity between the element coordinate systems of the rigid elements is generated by using these grasped rotation angles and tilt angles. In this embodiment, the transformation tensor between the element coordinate systems includes a transformation tensor R(C_foot→C_crus) from the foot coordinate system C14 to the crus coordinate system C12, a transformation tensor R(C_crus→C_thigh) from the crus coordinate system C12 to the thigh coordinate system C10, a transformation tensor R(C_thigh→C_waist) from the thigh coordinate system C10 to the waist coordinate system C6, a transformation tensor R(C_abdomen→C_waist) from the abdomen coordinate system C7 to the waist coordinate system C6, and a transformation tensor R(C_chest→C_waist) from the chest coordinate system C8 to the waist coordinate system C6. R(C_foot→C_crus), R(C_crus→C_thigh), and R(C_thigh→C_waist) are generated for each of the right and left leg sections S2 individually.

An example of the transformation tensor between the element coordinate systems generated here is given below. For example, as shown in FIG. 5, it is supposed that the rotation angle of the knee joint 11 (the rotation angle of the knee joint J11) grasped from the detected output of the joint displacement sensor 22 of the knee joint 11 is $\theta y$ around the Y axis (the axis perpendicular to the surface of the page showing FIG. 5) of the thigh coordinate system C10. In this example, however, the rotation angle of the knee joint 11 around the X axis and the Z axis of the element coordinate system C10 is assumed to be zero. In addition, the rotation angle around the Y axis of the knee joint 11 is established with the direction in which the leg 2 stretches being considered as the forward direction and thus $\theta y<0$ in the shown example. In this condition, the transformation tensor R(C_crus→C_thigh) is expressed by a matrix of order 3 as in the following formula (1):

$$R(C\_crus \to C\_thigh) = \begin{bmatrix} \cos\theta y & 0 & \sin\theta y \\ 0 & 1 & 0 \\ -\sin\theta y & 0 & \cos\theta y \end{bmatrix} \quad (1)$$

Only the rotation around a single axis (around the Y axis) of the knee joint 11 is assumed in the example shown in FIG. 5 and therefore the transformation tensor R(C_crus→C_thigh)

is expressed by the simple matrix as in the formula (1), though it has a more complicated form in general.

Moreover, for example, the transformation tensor R(C_abdomen→C_waist) is expressed by a matrix having the same form as in the matrix in the right-hand side of the formula (1), supposing that θy is the tilt angle of the abdomen 7 relative to the waist 6 (note here that the tilt angle θy is established on the assumption that the direction of tilt toward the front of the human being 1 is defined as the forward direction). The same applies to the transformation tensor R(C_chest→C_waist). More specifically, in this embodiment, the lower joint of the upper body JU1 and the upper joint of the upper body JU2 of the rigid link model S1 are measured in the tilt angles to the waist element S6 of the abdomen element S7 and the chest element S8 generated by the rotation around a single axis (the Y-axis rotation of C_abdomen and C_chest), and therefore the transformation tensors R(C_abdomen→C_waist) and R(C_chest→C_waist) are always expressed each by a matrix having the same form as the matrix in the right-hand side of the formula (1). It is, however, possible to measure the tilt angles around two axes of the abdomen element S7 and the chest element S8, supposing that the lower joint of the upper body JU1 and the upper joint of the upper body JU2 are rotatable around two axes (for example, around two axes of the Y axis and the X axis of C_abdomen and C_chest), for example.

Subsequently, the transformation tensor between the element coordinate systems obtained as described above can be used to obtain a transformation tensor for coordinate-transforming the vector quantity described in each element coordinate system (described by using a coordinate component value in each element coordinate system) into the body coordinate system BC (transforming the vector quantity to a description with the coordinate component value in the body coordinate system BC).

In this case, since the waist coordinate system C6 (C_waist) is assumed to be equal to the body coordinate system BC in this embodiment, the transformation tensor R(C_waist→BC) from C_waist to the body coordinate system BC is expressed by an identity matrix of order 3. In addition, the transformation tensors R(C_abdomen→BC) and R(C_chest→BC) from the abdomen coordinate system C7 (C_abdomen) and the chest coordinate system C8 (C_chest) to the body coordinate system BC are the same as the previously obtained transformation tensors between element coordinate systems R(C_abdomen→C_waist) and R(C_chest→C_waist), respectively. The transformation tensors from other element coordinate systems C10 (C_thigh), C12 (C_crus), and C14 (C_foot) to the body coordinate system BC are determined in order of getting away from the waist element S6 as expressed by the following formulas (2a) to (2c):

$$R(C\_thigh \rightarrow BC) = R(C\_waist \rightarrow BC) \times R(C\_thigh \rightarrow C\_waist) \quad (2a)$$

$$R(C\_crus \rightarrow BC) = R(C\_thigh \rightarrow BC) \times R(C\_crus \rightarrow C\_thigh) \quad (2b)$$

$$R(C\_foot \rightarrow BC) = R(C\_crus \rightarrow BC) \times R(C\_foot \rightarrow C\_crus) \quad (2c)$$

R(C_thigh→BC), R(C_crus→BC), and R(C_foot→BC) are calculated for each of the leg sections S2 individually. More specifically, a transposition of the transformation tensor from each element coordinate system to the body coordinate system BC is to be a transformation tensor for use in an inverse transformation (a coordinate transformation from the body coordinate system BC to the element coordinate system concerned). For example, $R(BC \rightarrow C\_thigh) = R(C\_thigh \rightarrow BC)^T$ (T denotes a transposition).

In the arithmetic processing of the joint and element center-of-gravity location calculation means 29 following the arithmetic processing of the transformation tensor generation means 28, position vectors in the body coordinate system BC of the centers of gravity of the joint elements and the rigid elements are calculated from the above calculated transformation tensors and the lengths and the centers of gravity locations (the positions in the element coordinate systems) of the rigid elements previously stored in the memory. Note here that the joint elements whose position vectors are calculated include the MP joint J14a.

The position vectors of the joint elements are calculated as described below. The description is made by taking calculations of the position vectors of the joint elements J9, J11, and J13 of, for example, the left leg section S2 as an example. Supposing that L6a is the length of the portion S6a between the hip joints J9, J9 of the waist element S6, the position vector U(J_left hip/C_waist) of the left hip joint J9 in C_waist is $(0, L6a/2, 0)^T$. Therefore, the position vector U(J_left hip/BC) of the left hip joint J9 in the body coordinate system BC is found by the following formula (3):

$$U(J\_left\ hip/BC) = R(C\_waist \rightarrow BC) \times U(J\_left\ hip/C \rightarrow waist) = R(C\_waist \rightarrow BC) \times (0, L6a/2, 0)^T \quad (3)$$

Furthermore, supposing that L10 is the length of the left thigh element S10, the position vector U(J_left hip/C_left thigh) of the left hip joint J9 in the left thigh coordinate system C10 (C_left thigh) is $(0, 0, L10)^T$. Therefore, the position vector U(J_left knee/BC) of the left knee joint J11 in the body coordinate system BC is found by the following formula (4):

$$U(J\_left\ knee/BC) = U(J\_left\ hip/BC) + \quad (4)$$
$$R(C\_left\ thigh \rightarrow BC) \times (-U(J\_left\ hip/C\_left\ thigh)) =$$
$$U(J\_left\ hip/BC) + R(C\_left\ thigh \rightarrow BC) \times (0, 0, -L10)^T$$

Hereinafter, similarly the position vectors U(J_left ankle/BC) and U(J_left MP/BC) in the body coordinate system BC of the left ankle joint J13 and the left MP joint J14a are calculated in order by the following formulas (5) and (6):

$$U(J\_left\ ankle/BC) = U(J\_left\ knee/BC) + \quad (5)$$
$$R(C\_crus \rightarrow BC) \times (-U(J\_left\ knee/C\_left\ crus)) =$$
$$U(J\_left\ knee/BC) + R(C\_crus \rightarrow BC) \times (0, 0, -L12)^T$$

$$U(J\_left\ MP/BC) = U(J\_left\ ankle/BC) + R(C\_left\ foot \rightarrow BC) \times \quad (6)$$
$$(-U(J\_left\ ankle/C\_left\ ankle/C\_left\ foot)) =$$
$$U(J\_left\ ankle/BC) + R(C\_left\ foot \rightarrow BC) \times (0, 0, -L14)^T$$

L12 in the formula (5) and L14 in the formula (6) are the length of the left crus element S12 and the length of the left foot element S14. The position vectors of the joint elements of the right leg section S2 are also calculated in the same manner as in the above.

Moreover, the position vectors of the joint elements of the upper body SU are calculated in the same manner as in the above, too. More specifically, the position vectors in the body coordinate system BC of the lower joint of the upper body JU1 and the upper joint of the upper body JU2 are found in order by the following formulas (7) and (8), respectively:

$$U(JU1/BC) = R(C\_waist \to BC) \cdot U(JU1/C\_waist) \quad (7)$$
$$= R(C\_waist \to BC) \cdot (0, 0, L6b)^T$$

$$U(JU2/BC) = U(JU1/BC) + R(C\_abdomen \to BC) \cdot \quad (8)$$
$$U(JU2/C\_abdomen)$$
$$= U(JU1/BC) + R(C\_abdomen \to BC) \cdot (0, 0, L7)^T$$

L6$b$ in the formula (7) is the length of the portion S6$b$ of the waist element S6. L7 in the formula (8) is the length of the abdomen element S7.

The position vectors in the body coordinate system BC of the centers of gravity of the rigid elements are calculated as described below. Specifically, the position vectors U(G_waist/BC), U(G_thigh/BC), U(G_crus/BC), and U(G_foot/BC) in the body coordinate system BC of the waist element S6, the thigh element S10, the crus element S12, and the foot element S14 are found by calculating the formulas in which U(J_left hip/C_waist), U(J_left hip/C_left thigh), U(J_left knee/C_left crus), and U(J_left ankle/C_left foot) in the right-hand side of the formulas (3) to (6) are replaced with the position vectors U(G_waist/C_waist), U(G_thigh/C_thigh), U(G_crus/C_crus), and U(G_foot/C_foot) of the centers of gravity of the rigid elements previously set in the corresponding element coordinate systems, respectively. The position vectors of G_thigh, G_crus, and G_foot are calculated for each of the leg sections S2 individually.

Moreover, the position vectors U(G_abdomen/BC) and U(G_chest/BC) in the body coordinate system BC of the centers of gravity G7 and G8 of the abdomen element S7 and the chest element S8 are found by the following formulas (9) and (10), respectively:

$$U(G\_abdomen/BC) = \quad (9)$$
$$U(JU1/BC) + R(C\_abdomen \to BC) \cdot U(G\_abdomen/C\_abdomen)$$

$$U(G\_chest/BC) = \quad (10)$$
$$U(JU2/BC) + R(C\_chest \to BC) \cdot U(G\_chest/C\_chest)$$

The above is the arithmetic processing of the transformation tensor generation means 28 and the joint and element center-of-gravity location calculation means 29. The position vectors of the joint elements and those of the centers of gravity of the rigid elements calculated by the joint and element center-of-gravity location calculation means 29 as described above have meanings of position vectors viewed in the body coordinate system BC of the actual regions of the human being 1 corresponding to them, respectively.

The arithmetic processing unit 18 performs the arithmetic processing of the body coordinate system acceleration calculation means 30 and the body coordinate system tilt angle calculation means 31 in parallel with the above arithmetic processing of the transformation tensor generation means 28 and the joint and element center-of-gravity location calculation means 29.

In the arithmetic processing of the body coordinate system acceleration calculation means 30, a value in the body coordinate system BC (coordinate component value) of the acceleration vector of the origin of the body coordinate system BC is found as described below from the 3-axis acceleration (translational acceleration) grasped from detected outputs of the acceleration sensor 16 and the 3-axis angular velocity grasped from detected outputs of the gyro sensor 17. First, the acceleration and the angular velocity respectively detected by the sensors 16 and 17 are vector quantities represented by the 3-axis coordinate system fixed to the sensors 16 and 17 (hereinafter, referred to as the sensor coordinate system SC or C_sensor) and therefore they are transformed into a value in the body coordinate system BC. The transformation is performed by multiplying the acceleration vector and the angular velocity vector detected in the sensor coordinate system SC by a transformation tensor preset according to the relative attachment positional relationship (the relative posture relationship of the sensor coordinate system SC to the waist coordinate system C6 (=the body coordinate system BC)) of the acceleration sensor 16 and the gyro sensor (angular velocity sensor) 17 to the waist 6. In other words, supposing that a detected value of the acceleration vector on the sensor coordinate system SC is ACC(sensor/SC), an acceleration vector obtained by transforming it into the body coordinate system BC is ACC(sensor/BC), a detected value of the angular velocity vector in the sensor coordinate system SC is ω(sensor/SC), and an angular velocity vector obtained by transforming it into the body coordinate system BC is ω(sensor/BC), the acceleration vector ACC(sensor/BC) and the angular velocity vector ω(sensor/BC) are found by the formulas (11) and (12) described below. At this point, ACC(sensor/BC) and ω(sensor/BC) are more specifically an acceleration vector and an angular velocity vector at the places of the acceleration sensor 16 and the gyro sensor 17. In this sense, the term "sensor" is added to the denotation of ACC and ω. In this example, the places of the acceleration sensor 16 and the gyro sensor 17 are substantially coincident with each other and the sensor coordinate system SC is the same for the both sensors 16 and 17.

$$ACC(sensor/BC) = R(SC \to BC) \cdot ACC(sensor/SC) \quad (11)$$

$$\omega(sensor/BC) = R(SC \to BC) \cdot \omega(sensor/SC) \quad (12)$$

Figure 6:
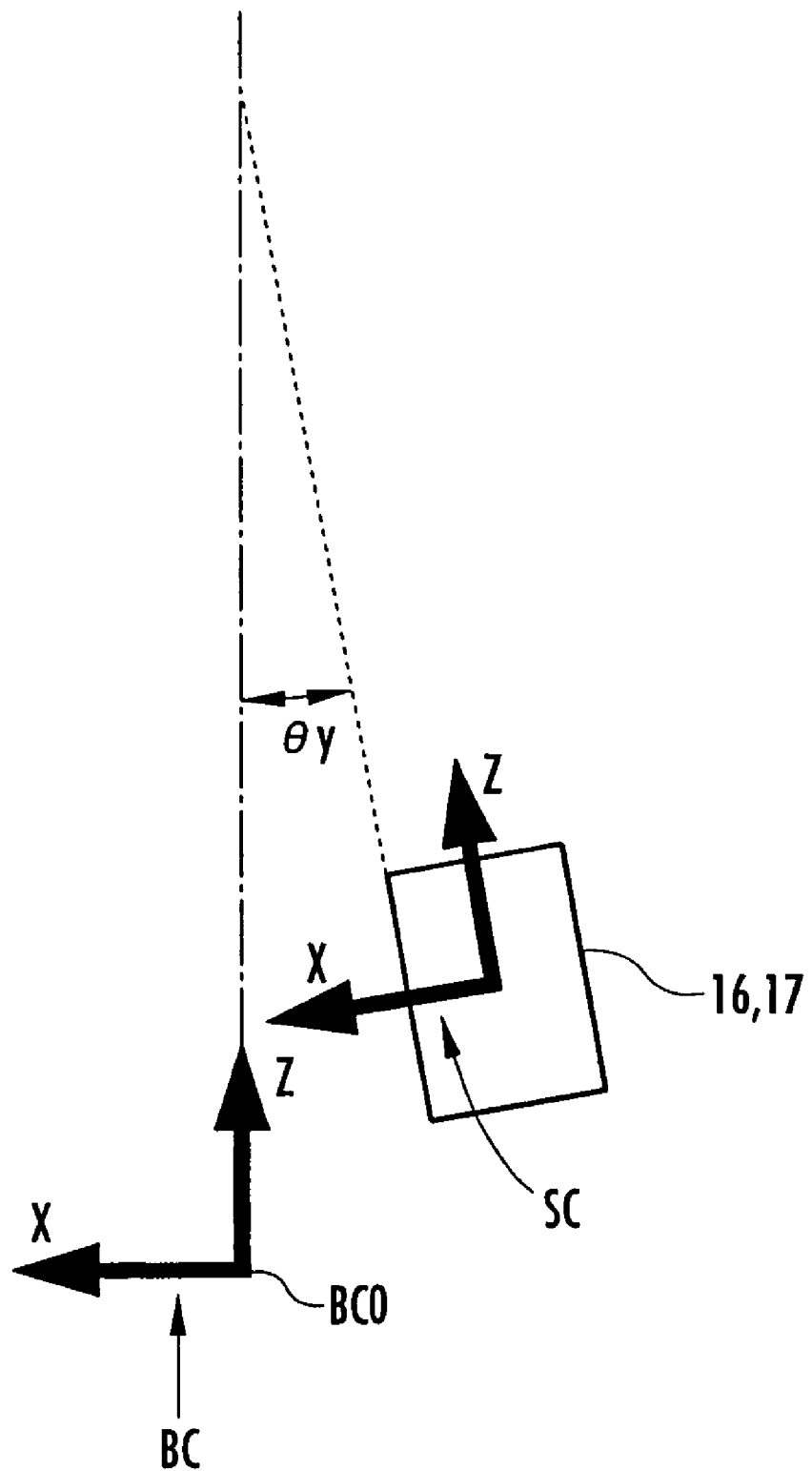
FIG. 6 is a diagram for explaining an example of a transformation tensor of a coordinate transformation for use in the embodiment.

In the above, the transformation tensor R(SC→BC) is obtained from the relative posture relationship between the sensor coordinate system SC and the body coordinate system BC (more specifically, the tilt angle of each axis of the sensor coordinate system SC to each axis of the body coordinate system BC) in the same manner as for the aforementioned transformation tensor between element coordinate systems (R(C_thigh→C_waist) or the like). For example, if the three axes (XYZ axes) of the sensor coordinate system SC are inclined by the angle θy around the Y axis (the axis perpendicular to the surface of the page of FIG. 6) of the body coordinate system BC as shown in FIG. 6, the transformation tensor R(SC→BC) is expressed by a matrix in the same form as the right-hand side of the aforementioned formula (1). In this case, the acceleration sensor 16 and the gyro sensor 17 are fixed to the waist 8 where the body coordinate system BC is established, and therefore the tilt angle of each axis of the sensor coordinate system SC to each axis of the body coordinate system BC has already been measured and known at the time of attachment of the acceleration sensor 16 and the gyro sensor 17 to the waist 8. Then, the transformation tensor R(SC→BC) is previously obtained based on the tilt angle and is stored in the memory, which is not shown, of the arithmetic processing unit 18. Additionally describing, the acceleration sensor 16 or the gyro sensor 17 may be attached to the region other than the waist 6 (a rigid equivalent part corresponding to one of the rigid elements of the rigid link model S1). In this case, to acquire the acceleration vector ACC(sensor/BC) or the angular velocity vector ω(sensor/BC), the detected value in the sensor coordinate system SC is transformed to a value in the element coordinate system of the rigid element to which the acceleration sensor 16 or the gyro sensor 17 is attached, and then it may be transformed to a value in the body coordinate system BC by using the transformation tensor obtained by the transformation tensor generation means 28.

In the arithmetic processing of the body coordinate system acceleration calculation means 30, the acceleration vector ACC(sensor/BC) and the angular velocity vector ω(sensor/BC) are found as described above and thereafter an acceleration vector ACC(BCO/BC) of the origin of the body coordinate system BC is found by the formula (13) below. "BCO" represents the origin of the body coordinate system BC.

$$ACC(BCO/BC) = \\ ACC(\text{sensor}/BC) + U(\text{sensor}/BC) \times \omega(\text{sensor}/BC)' + \\ \begin{bmatrix} 0 & U(\text{sensor}/BC)x & U(\text{sensor}/BC)x \\ U(\text{sensor}/BC)y & 0 & U(\text{sensor}/BC)y \\ U(\text{sensor}/BC)z & U(\text{sensor}/BC)z & 0 \end{bmatrix} \times \\ \begin{bmatrix} \omega(\text{sensor}/BC)x^2 \\ \omega(\text{sensor}/BC)y^2 \\ \omega(\text{sensor}/BC)z^2 \end{bmatrix} \quad (13)$$

Note) ACC(BCO/BC) is a vector that is equal to the sensor output value obtained when the sensor is set at the origin of the body coordinate system BC and the direction of the sensor axes are coincident with those of the body coordinate system BC.

In the formula (13), U(sensor/BC) is a position vector of the acceleration sensor 16 and the gyro sensor 17 in the body coordinate system BC, and U(sensor/BC)x, U(sensor/BC)y, and U(sensor/BC)z are coordinate component values in the body coordinate system BC of U(sensor/BC) according to the aforementioned definition of the notation method of a coordinate component value of a vector in this specification. U(sensor/BC) is measured at the time of attachment of the acceleration sensor 16 and the gyro sensor 17 to the waist 8 and stored in the memory of the arithmetic processing unit 18. In addition, ω(sensor/BC)x, ω(sensor/BC)y, and ω(sensor/BC)z are coordinate component values of the angular velocity vector ω(sensor/BC) previously obtained. Furthermore, ω(sensor/BC)' indicates a first-order deviation value of ω(sensor/BC) and the value is calculated from time series data of ω(sensor/BC) found by the aforementioned formula (12) for each arithmetic processing period of the arithmetic processing unit 18. Additionally, the angular velocity is identical in any portion within the waist element S6. For example, the angular velocity ω(BCO/BC) of the origin BCO of the body coordinate system BC fixed to the waist element S6 is equal to ω(sensor/BC).

Since the acceleration sensor 16 also detects an acceleration accompanying the gravity, the acceleration vector ACC(BCO/BC) obtained as described above includes an inertial acceleration component caused by the gravity. Moreover, while the acceleration vector ACC(BCO/BC) of the origin BCO of the body coordinate system BC has been found in consideration of the angular speed of the waist element S6 in this embodiment, the angular velocity of the waist element S6 and its rate of change are relatively low and therefore ACC(sensor/BC) found by the aforementioned formula (11) may be an acceleration vector ACC(BCO/BC) of the origin BCO of the body coordinate system BC directly.

In the arithmetic processing of the body coordinate system tilt angle calculation means 31, a tilt angle of the waist element S6 (a tilt angle of the Z axis of the body coordinate system BC) relative to the vertical direction (the direction of gravitational force) is calculated by using the so-called Kalman filter from detected outputs of the acceleration sensor 16 and the gyro sensor 17. The calculation method is already known and therefore its description is omitted here. The tilt angle calculated here is around two axes, namely, the horizontal axis in the forward/backward direction and the horizontal axis in the right/left direction.

Subsequently, the arithmetic processing unit 18 performs the arithmetic processing of the total/element center-of-gravity motion calculation means 32. In the arithmetic processing of the total/element center-of-gravity motion calculation means 32 first, a position vector U(G_total/BC) in the body coordinate system BC of the total center-of-gravity of the rigid link model S1 (the total center-of-gravity of the human being 1, hereinafter referred to as G_total in some cases) is found by the following formula (14), from the centers of gravity location of the rigid elements (the position vectors in the body coordinate system BC) found by the joint and element center-of-gravity location calculation means 29 and the weights of the rigid elements preset as described above:

$$U(G\_total/BC) = \{U(G\_chest/BC) \times m\_chest + U(G\_abdomen/BC) \times m\_abdomen + U(G\_waist/BC) \times m\_waist + U(G\_right\ thigh/BC) \times m\_right\ thigh + U(G\_left\ thigh/BC) \times m\_left\ thigh + U(G\_right\ crus/BC) \times m\_right\ crus + U(G\_left\ crus/BC) \times m\_left\ crus + U(G\_right\ foot/BC) \times m\_right\ foot + U(G\_left\ foot/BC) \times left\ foot\}/total\ weight \quad (14)$$

The term "m_□□" such as m_chest is a weight of a rigid element corresponding to the name of □□. As shown by the formula (14), the position vector of the total center-of-gravity U(G_total/BC) is found by dividing the total sum of the products of the position vector in the body coordinate system BC of the center of gravity of the each rigid element of the rigid link model S1 and the weight of the corresponding rigid element by the total weight of the human being 1 (=the total sum of the weights of all the rigid elements).

In the arithmetic processing of the total/element center-of-gravity motion calculation means 32 a second derivative U(G_total/BC)" of U(G_total/BC) is calculated from the time-series data (the time-series value of U(G_total/BC) for each arithmetic processing period of the arithmetic processing unit 18) of the position vector U(G_total/BC) of the total center-of-gravity calculated as described above. The second derivative U(G_total/BC)" denotes a relative acceleration of the total center-of-gravity G_total to the origin BCO of the body coordinate system BC. Then, the second derivative U(G_total/BC)", namely, the relative acceleration of G_total to the origin BCO of the body coordinate system BC is added to the acceleration vector ACC(BCO/BC) of the origin BCO of the body coordinate system BC previously found by the body coordinate system acceleration calculation means 30, by which an actual acceleration vector ACC(G_total/BC) of G_total is calculated. In other words, ACC(G_total/BC) is calculated by the following formula (15):

$$ACC(G\_total/BC) = ACC(BCO/BC) + U(G\_total/BC)" \quad (15)$$

Moreover, in the arithmetic processing of the total/element center-of-gravity motion calculation means 32, a second-order deviation value of the position vector of each center of gravity, namely, a relative acceleration of the center of gravity of each rigid element to the origin BCO of the body coordinate system BC is calculated from the time-series data (the time-series value for each arithmetic processing period of the arithmetic processing unit 18) of the position vector (the position vector in the body coordinate system BC) of the center of gravity of each of the thigh element S10, the crus element S12, and the foot element S14 of the each leg section S2 previously calculated by the joint and element center-of-gravity location calculation means 29. Then, the relative acceleration of the center of gravity of the each rigid element is added to the acceleration vector ACC(BCO/BC) of the origin BCO of the body coordinate system BC previously found by the body coordinate system acceleration calculation means 30, by which an actual acceleration vector of the center of gravity of the each rigid element is calculated. For example, the acceleration vector ACC(G_thigh/BC) of the center of gravity G_thigh (G10) of each thigh element S10 is calculated by adding ACC(BCO/BC) to the second derivative U(G_thigh/BC)" of the position vector U(G_thigh/BC) of G_thigh in the same manner as in the formula (15). The same applies to the crus element S12 and the foot element S14.

Subsequently, the arithmetic processing unit 18 performs computations of the floor reaction force estimation means 33 and the floor reaction force acting point estimation means 34. In the arithmetic processing of the floor reaction force estimation means 33, first, it is determined whether the motion state of the human being 1 is the two-leg supporting state in which both legs 2, 2 are landing or the one-leg supporting state in which only one of the legs 2 is landing on the basis of detected outputs of the landing sensors 24, 25. More specifically, if one of the landing sensors 24 and 25 of one leg 2 outputs the ON signal indicating the landing of the leg and at the same time one of the landing sensors 24 and 25 of the other leg 2 outputs the ON signal indicating the landing of the leg, it is determined that the human being 1 is in the two-leg supporting state. Moreover, if one of the landing sensors 24 and 25 of one leg 2 of the legs 2, 2 outputs the ON signal indicating the landing of the leg and at the same time neither of the landing sensors 24 and 25 of the other leg 2 outputs the ON signal indicating the landing of the leg, it is determined that the human being 1 is in the one-leg supporting state. Then, in the processing of the floor reaction force estimation means 33, the floor reaction force vector acting on each leg 2 is estimated by the arithmetic processing for each state according to whether the human being 1 is in the two-leg supporting state or in the one-leg supporting state.

Figure 7:
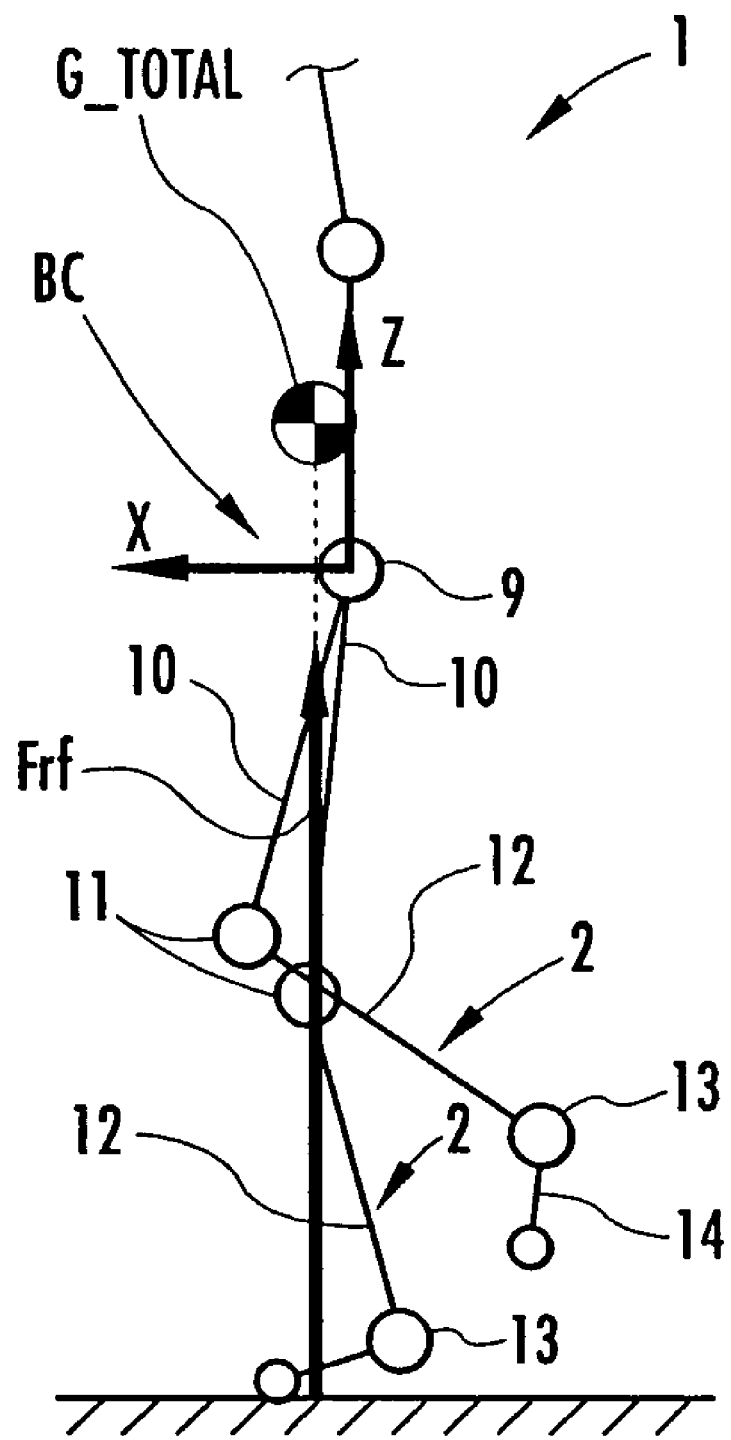
FIG. 7 is a diagram for explaining a method of estimating a floor reaction force vector in a one-leg supporting state of the two-legged walking mobile body.
Figure 8A:
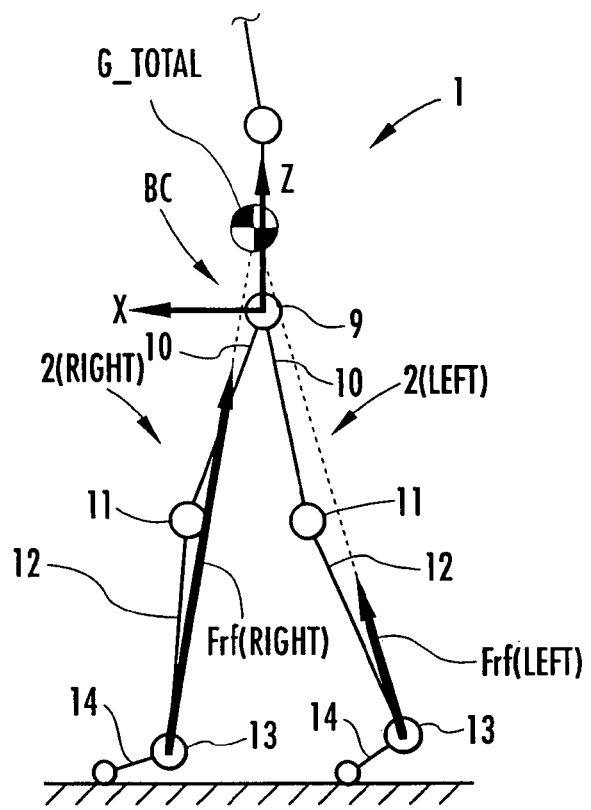
FIGS. 8(a), (b) are diagrams each for explaining a method of estimating floor reaction force vectors in a two-leg supporting state of the two-legged walking mobile body.
Figure 8B:
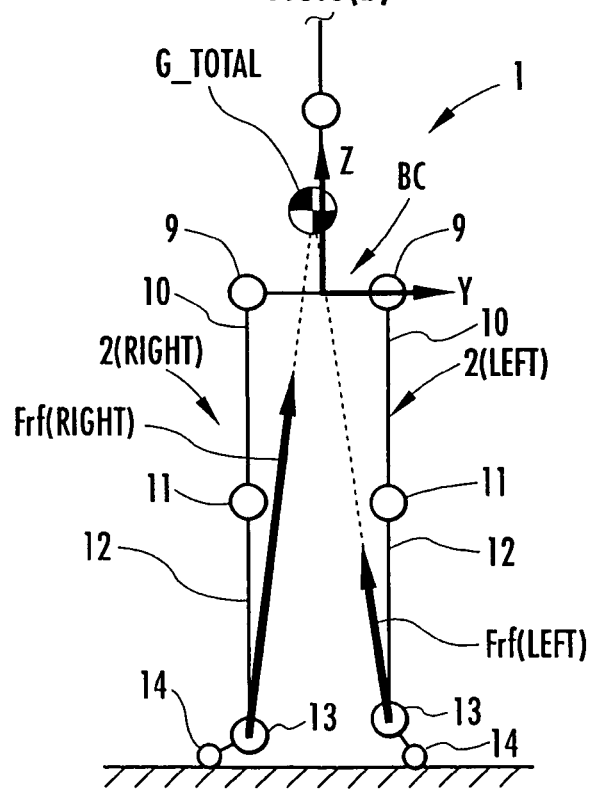

The basic idea of the estimation processing of the floor reaction force vector is the same as one suggested earlier by the applicant of this application in Japanese Patent Laid-Open No. 2003-89083 and the like, except that mainly the coordinate system and the like for use in the estimation processing in this embodiment differ from those of the method described in the gazettes. They are described hereinafter by referring to FIG. 7 and FIGS. 8(a), (b). FIG. 7 illustrates the one-leg supporting state of the human being 1 viewed on the sagittal plane and FIGS. 8(a), (b) illustrate the two-leg supporting states of the human being 1 viewed on the sagittal plane and the frontal plane, respectively. In FIG. 7 and FIG. 8, the human being 1 is typically shown in the form of a rigid link model. As shown in FIG. 7, if the motion state of the human being 1 is in the one-leg supporting state, a representation of the floor reaction force vector Frf(right leg/BC) acting on the landing leg 2 (assumed here to be, for example, the right leg 2), namely, the floor reaction force vector acting on the landing right leg 2 with a coordinate component value in the body coordinate system BC is calculated by the following formula (16) representing an equation of motion related to the translational motion in the body coordinate system BC of the total center-of-gravity G_total:

$$Frf(\text{right leg}/BC) = \text{total weight} \times ACC(G\_total/BC) \quad (16)$$

More specifically, the floor reaction force vector Frf(right leg/BC) is calculated by the formula (16) from the acceleration vector ACC(G_total/BC) of G_total calculated by the total/element center-of-gravity motion calculation means 32 and the total weight of the human being 1 (the total weight of the rigid link model S1). Even if the left leg 2 is landing, the floor reaction force vector Frf(left leg/BC) is calculated by the operation of the right-hand side of the formula (16) in the same manner in the one-leg supporting state. In this case, ACC(G_total/BC) includes an inertial acceleration component generated by the center of gravity and the floor reaction force vector Frf is expressed in the body coordinate system BC as described above, and therefore there is no need to consider the gravitational acceleration or the gravity direction. The floor reaction force vector Frf acting on the leg 2 not landing is zero. While the Z axis of the body coordinate system BC is taken in the vertical direction for convenience of illustration in FIG. 7, the formula (16) does not depend upon the tilt of the body coordinate system BC.

On the other hand, as shown in FIGS. 8(a), (b), if the human being 1 is in the two-leg supporting state, the floor reaction force vector Frf(right leg/BC) acting on the right leg 2 and the floor reaction force vector Frf(left leg/BC) acting on the left leg 2 are calculated based on the following five relational expressions (17) to (21):

$$Frf(\text{right leg}/BC) + Frf(\text{left leg}/BC) = \\ \text{total weight} \times ACC(G\_total/BC) \quad (17)$$

$$FRf(\text{right leg}/BC)x : Frf(\text{right leg}/BC)z = U(G\_total/BC)x - \\ U(J\_right\ ankle/BC)x : U(G\_total/BC)z - U(J\_right\ ankle/BC)z \quad (18)$$

$$Frf(\text{left leg}/BC)x : Frf(\text{left leg}/BC)z = U(G\_total/BC)x - \\ U(J\_left\ ankle/BC)x : U(G\_total/BC)z - U(J\_left\ ankle/BC)z \quad (19)$$

$$Frf(\text{right leg}/BC)y : Frf(\text{right leg}/BC)z = U(G\_total/BC)y - \\ U(J\_right\ ankle/BC)y : U(G\_total/BC)z - U(J\_right\ ankle/BC)z \quad (20)$$

$$Frf(\text{left leg}/BC)y : Frf(\text{left leg}/BC)z = ACC(G\_total/BC)y - \\ U(J\_left\ ankle/BC)y : U(G\_total/BC)z - U(J\_left\ ankle/BC)z \quad (21)$$

The meanings of these formulas (17) to (21) will be described here. The formula (17) represents an equation of motion related to the translational motion in the body coordinate system BC of the total center-of-gravity G_total. Furthermore, the formulas (18) to (21) are geometrical relational expressions obtained on the assumption that the floor reaction force vector Frf(right leg/BC) and the floor reaction force vector Frf(left leg/BC) are vectors from the ankle joint 13 of the right leg 2 and from the ankle joint 13 of the left leg 2 toward the total center-of-gravity G_total, respectively, as shown in FIGS. 8(a), (b), in other words, that the floor reaction force vector Frf is oriented in the same direction as for the position vector of G_total viewed from the left ankle joint 13. In this case, the formulas (18) and (19) are relational expressions for a view on the sagittal plane (the XZ plane of the body coordinate system BC), and the formulas (20) and (21) are relational expressions for a view on the frontal plane (the YZ plane of the body coordinate system BC). While the Z axis of the body coordinate system BC is taken in the vertical direction in FIG. 8 for convenience of illustration, the formulas (17) to (21) do not depend upon the tilt of the body coordinate system BC. Moreover, the ankle joint 13 of the each leg 2 has a significance of a specific portion in the vicinity of the lower end of the leg 2 in this embodiment.

To find the floor reaction force vectors Frf(right leg/BC) and Frf(left leg/BC) in the two-leg supporting state, Frf(right leg/BC) and Frf(left leg/BC) are calculated by solving a simultaneous equation composed of the formulas (17) to (21) with the coordinate component values of these vectors defined as unknowns. More specifically, Frf(right leg/BC) and Frf(left leg/BC) are calculated from the total weight of the human being 1, ACC(G_total/BC) and U(G_total/BC) found by the total/element center-of-gravity motion calculation means 32, and U(J_right ankle/BC) and U(J_left ankle/BC) found by the joint and element center-of-gravity location calculation means 29. In this manner, the floor reaction force vectors Frf(right leg/BC) and Frf(left leg/BC) in the two-leg supporting state are calculated based on the relational expressions (17) to (21) described in the body coordinate system BC in this embodiment.

The Z-axis components of Frf(right leg/BC) and Frf(left leg/BC) can be found by using either the formulas (18), (19) related to the sagittal plane or the formulas (20), (21) related to the frontal plane.

In the arithmetic processing of the floor reaction force acting point estimation means 34, a transformation tensor R(BC→IC) from the body coordinate system BC to an absolute coordinate system IC is generated, first, based on the tilt angle to the vertical direction of the waist element S6 calculated by the body coordinate system tilt angle calculation means 31. Note here that the absolute coordinate system IC is a rectangular coordinate system whose Z axis is taken in the vertical direction and whose coordinate axes are oriented in the same directions as those of the body coordinate system BC in the reference posture condition. The transformation tensor R(IC→BC) from the absolute coordinate system IC to the body coordinate system BC is a transposition $R(BC→IC)^T$ of the transformation tensor R(BC→IC).

Subsequently, the position vector U(G_total/BC) of the total center-of-gravity G_total previously found by the total/element center-of-gravity motion calculation means 32 and the respective position vectors U(J_ankle/BC) and U(J_MP/BC) of the ankle joint J13 and the MP joint J14a of the each leg section S2 previously found by the joint and element center-of-gravity location calculation means 29 are each multiplied by the transformation tensor R(BC→IC) by using the above transformation tensor R(BC→IC), thereby achieving the calculations of the position vectors U(G_total/IC), U(J_ankle/IC), and U(J_MP/IC) viewed on the absolute coordinate system IC of the total center-of-gravity G_total, the ankle joint J13, and the MP joint J14a. These position vectors U(G_total/IC), U(J_ankle/IC), and U(J_MP/IC) are those in the absolute coordinate system IC having the same origin as of the body coordinate system BC. Regarding the leg 2 determined not to be landing on the basis of detected outputs of the landing sensors 24, 25, there is no need to calculate the position vectors U(J_ankle/IC) and U(J_MP/IC).

Figure 9A:
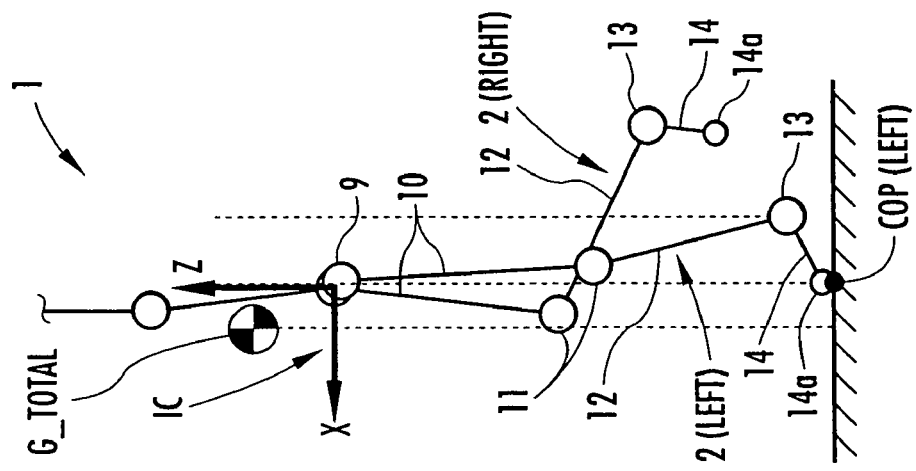
FIGS. 9(a) to (c) are diagrams each for explaining a method of estimating the point of application of the floor reaction force vector.
Figure 9B:
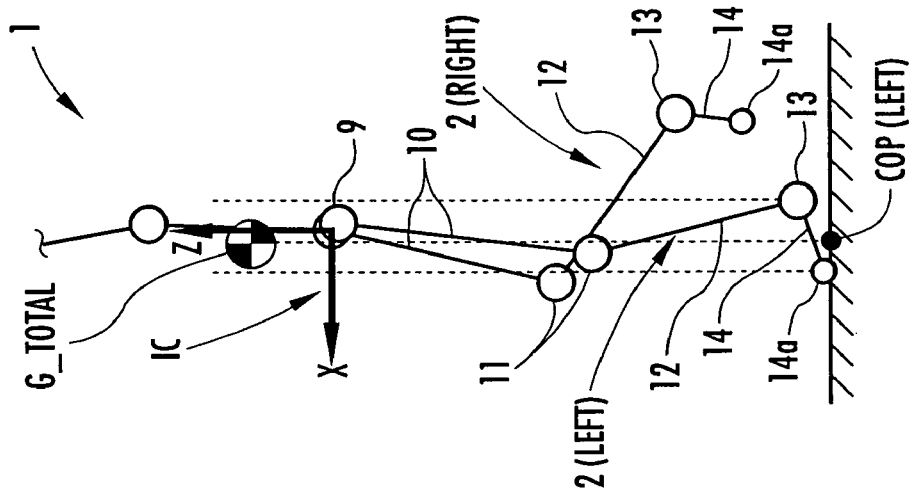
Figure 9C:
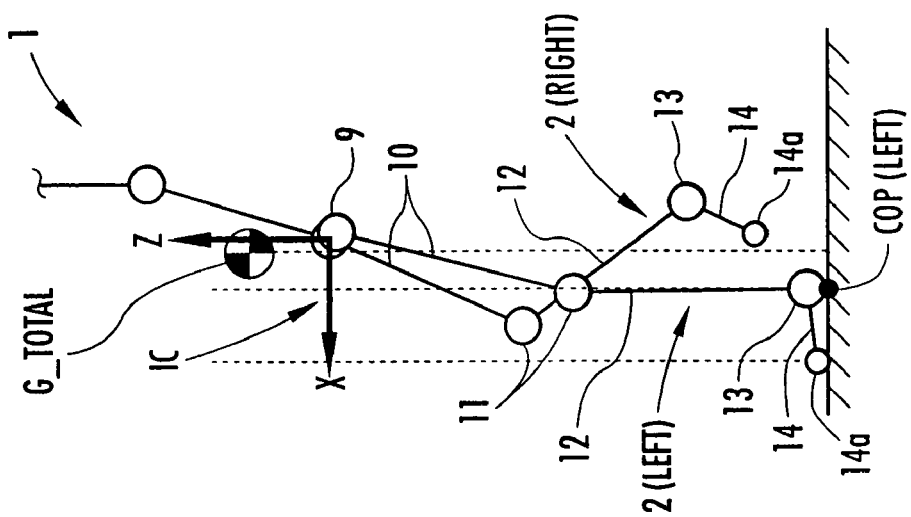
Figure 10:
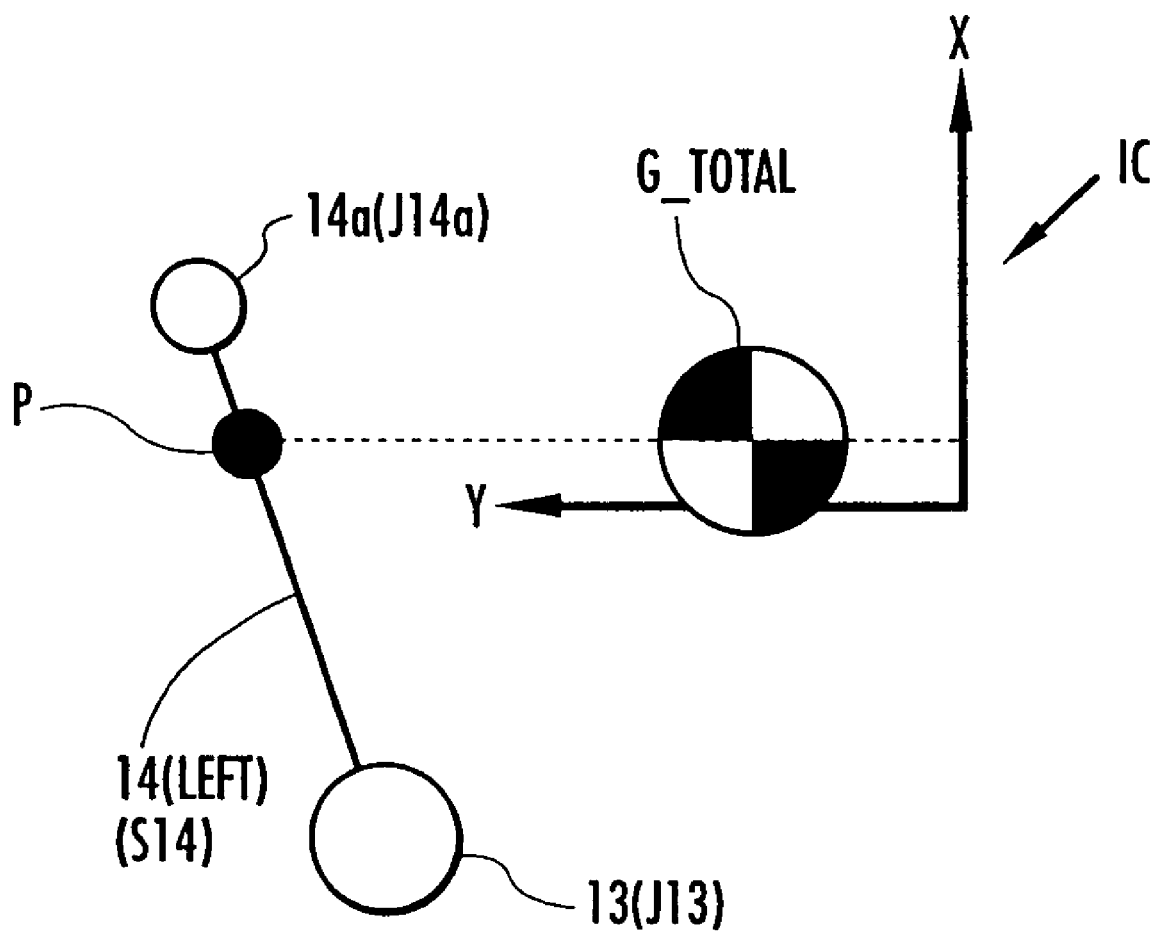
FIG. 10 is a diagram for explaining a method of estimating a Y-axis direction component of the point of application of the floor reaction force vector in the state of FIG. 9(b).

Subsequently, for each leg 2 determined to be landing on the basis of detected outputs of the landing sensors 24, 25, the X-axis component and the Y-axis component of the position vector (the position vector in the absolute coordinate system IC). U(COP/IC) of the floor reaction force acting point are determined according to the magnitude relation of the X-axis direction components U(G_total/IC)x, U(J_ankle/IC)x, and U(J_MP/IC)x of the position vectors U(G_total/IC), U(J_ankle/IC), and U(J_MP/IC), in other words, according to the relative horizontal positional relationship in the forward/backward direction of the total center-of-gravity G_total, the ankle joint 13, and the MP joint 14a. This determination method is described in more detail by referring to FIGS. 9(a) to (c) and FIG. 10. Note here that the left leg 2 is assumed to be landing in the description below. FIGS. 9(a) to (c) illustrate states in which the left leg 2 of the human being 1 is landing (the one-leg supporting state in these diagrams), viewed on the sagittal plane. FIG. 10 shows a plan view of the foot 14 of the landing leg in the state of FIG. 9(b). In FIG. 9 and FIG. 10, the human being 1 is typically shown in the form of a rigid link model.

As shown in FIG. 9(a), if the total center-of-gravity G_total is more forward than the MP joint 14a of the landing left leg 2, in other words, if U(G_total/IC)x>U(J_left MP/IC)x, the foot 14 of the left leg 2 is landing with the leg braced mainly in the toe-side portion. In this case, the floor reaction force acting point COP exists substantially just under the MP joint 14a of the foot. Therefore, in this case, it is considered that the X- and Y-axis components of the position vector U(left COP/IC) of the floor reaction force acting point COP are equal to the X- and Y-axis components of the position vector U(J_left MP/IC) of the MP Joint 14a, respectively. In other words, U(left COP/IC)x=U(J_left MP/IC)x and U(left COP/IC)y=U(J_left MP/IC)y.

Moreover, as shown in FIG. 9(c), if the total center-of-gravity G_total is more backward than the ankle joint 13 of the landing left leg 2, in other words, if U(G_total/IC)x<U(J_left ankle/IC)x, the foot 14 of the left leg 2 is landing with the leg 2 braced mainly in the heel-side portion. In this case, the floor reaction force acting point COP exists substantially just under the ankle joint 13 of the left leg 2. Therefore, in this case, it is considered that the X- and Y-axis components of the position vector U(left COP/IC) of the floor reaction force acting point COP are equal to the X- and Y-axis components of the position vector U(J_left ankle/IC) of the ankle joint 13, respectively. In other words, U(left COP/IC)x=U(J_left ankle/IC)x and U(left COP/IC)y=U(J_left ankle/IC)y.

Moreover, as shown in FIG. 9(b), if the total center-of-gravity G_total exists between the ankle joint 13 of the left leg 2 and the MP joint 14a in the forward/backward direction, in other words, if U(J_left MP/IC)x≦U(G_total/IC)x≦U(J_left ankle/IC)x, the floor reaction force acting point COP exists substantially just under the total center-of-gravity G_total on the shown sagittal plane. Therefore, in this case, it is considered that the X-axis component of the position vector U(left COP/IC) of the floor reaction force acting point COP is equal to the X-axis component of the total center-of-gravity G_total. In other words, it is assumed that U(right and left COP/IC)x=U(G_total/IC)x. Then, the floor reaction force acting point COP exists on a contact surface between the foot 14 of the landing left leg 2 and the floor surface (in this case, the contact surface is substantially the total surface of the bottom face of the foot 14), and the position of the floor reaction force acting point COP is thought to be generally on a line segment generated by projecting the line segment between the center of the ankle joint 13 and the center of the MP joint 14a onto the floor surface. Accordingly, it is considered that the Y-axis component of the position vector U(right COP/IC) of the floor reaction force acting point COP is equal to the Y-axis component of a point P where the value of the total center-of-gravity G_total is equal to the value of the X-axis component (the X-axis component in the absolute coordinate system IC) on the central axis of the foot element S14 (on the line segment between the center of the ankle joint 13 and the center of the MP joint 14a) of the left leg 2 as shown in FIG. 10. The value of the Y-axis component of the position vector U(right COP/IC) is found based on the following formula (22) indicating the proportional relation:

$$U(\text{left } COP/IC)x - \qquad (22)$$

$$U(\text{J\_left ankle}/IC)x : U(\text{J\_left } MP/IC)x - U(\text{J\_left ankle}/IC)x =$$

$$U(\text{left } COP/IC)y - U(\text{J\_left ankle}/IC)$$

$$y : U(\text{J\_left } MP/IC)y - U(\text{J\_left ankle}/IC)y$$

Moreover, it is assumed that the Z-axis component of the position vector U(left COP/IC) of the floor reaction force acting point is equal to the Z-axis component of the point, which is a predetermined value H0 (>0) away from the ankle joint 13 (the ankle element J13) of the left leg 2 downward in the vertical direction. In other words, it is assumed that U(left COP/IC)z=U(J_left ankle/IC)z−H0. In this regard, the predetermined value H0 is a distance in the vertical direction from the floor surface to the center of the ankle joint 13 in the reference posture condition (more accurately, in the state where the almost total bottom face of the foot 14 is put in contact with the horizontal floor surface), and it is previously measured and stored in the memory of the arithmetic processing unit 18. While the predetermined value H0 may be measured for each of the right and left legs 2 individually, a value measured for one of the legs 2 may be used for the both legs 2 in common.

In this embodiment, we can obtain the position vector U(left COP/IC) of the floor reaction force acting point of the floor reaction force vector Frf acting on the left leg when the left leg 2 is landing, as described hereinabove. The same applies to the right leg 2 when it is landing. In this instance, in the two-leg supporting state, the position vector of the floor reaction force acting point is found as described above for each of the both legs 2.

In this embodiment, the predetermined value H0 for use in finding the Z-axis component of the position vector U(COP/IC) of the floor reaction force acting point has been defined as a constant value. If, however, the landing sensors 24 and 25 detect that the foot 14 is in contact with the ground only in the toe-side portion, in other words, if only the landing sensor 25 outputs an ON signal indicating the landing of the leg, you may use the difference in the Z-axis component (U(J_ankle/IC)z−U(J_MP/IC)z) between the position vectors U(J_ankle/IC) and U(J_MP/IC) of the ankle joint 13 and the MP joint 14a, namely, the distance in the vertical direction between the ankle joint 13 and the MP joint 14a, instead of the predetermined value H0, regarding the landing leg 2. This improves the accuracy of U(COP/IC).

In the arithmetic processing of the floor reaction force acting point estimation means 34, finally the value U(COP/BC) in the body coordinate system BC of the position vector of the floor reaction force acting point is found by multiplying the position vector U(COP/IC) of the floor reaction force acting point obtained for each landing leg 2 as described above by the inverse transformation tensor R(IC→BC), which is a transposition of the previously obtained transformation tensor R(BC→IC).

Subsequently, the arithmetic processing unit 18 performs arithmetic processing of the joint moment estimation means 35. Describing the outline of the arithmetic processing of the joint moment estimation means 35, the joint moments of the joint elements J_ankle, J_knee, and J_hip at the endpoints on the waist element S6 side of the foot element S14, the crus element S12, and the thigh element S10 are calculated in order by the operations of the inverse dynamics model based on the equations of motion related to the translational motion and the rotary motion of the foot element S14, the crus element S12, and the thigh element S10 of the each leg section S2.

Explaining in concrete terms hereinafter, the equations of motion of the translational motion of the foot element S14, the crus element S12, and the thigh element S10 are given by the formulas (23) to (25) described below. In the following description, generally one end closer to the waist element S6 is sometimes denoted by "P_□□" and the other end farther from the waist element S6 is sometimes denoted by "D_□□" (□□ is a name of the rigid element) for both ends of each of the rigid elements of the foot element S14, the crus element S12, and the thigh element S10. For example, the end of the crus element S12 on the knee joint J_knee (J11) side is denoted by "P_crus" and the other end on the ankle joint J_ankle (J13) side is denoted by "D_crus." The terms "one end closer to the waist element S6" does not mean that it is closer to the waist element S6 in distance, but means that less rigid elements lie between the one end and the waist element S6. Similarly, the terms "the other end farther from the waist element S6" means that more rigid elements lie between the other end and the waist element S6.

$$F(\text{P\_foot}/BC) = \text{m\_foot} \times ACC(\text{G\_foot}/BC) - F(\text{D\_foot}/BC) \qquad (23)$$

$$F(\text{P\_crus}/BC) = \text{m\_crus} \times ACC(\text{G\_crus}/BC) - F(\text{D\_crus}/BC) \qquad (24)$$

$$F(\text{P\_thigh}/BC) = \text{m\_thigh} \times ACC(\text{G\_thigh}/BC) - F(\text{D\_thigh}/BC) \qquad (25)$$

In the above, the two denotations, F(P_□□/BC) and F(D_□□/BC), appearing in the above formulas (23) to (25) mean respectively reaction forces (translational force vectors expressed in the body coordinate system BC) applied by an object put in contact with both ends of the rigid element whose name is represented by □□ to the ends thereof. In this case, F(D_foot/BC) is equal to the floor reaction force vector Frf(leg/BC) found by the floor reaction force estimation means 33. In addition, F(D_crus/BC)=−F(P_foot/BC) and F(D_thigh/BC)=−F(P_crus/BC).

Accordingly, F(P_foot/BC), namely, the translational force acting on the ankle joint J_ankle is found by the calculation of the right-hand side of the formula (23) from the floor reaction force vector Frf(leg/BC) found by the floor reaction force estimation means 33, the acceleration vector ACC(G_foot/BC) of the center of gravity of the foot element S14 obtained by the total/element center-of-gravity motion calculation means 32, and the weight m_foot of the foot element S14. In addition, F(P_crus/BC), namely, the translational force acting on the knee joint J_knee is found by the calculation of the right-hand side of the formula (24) from the found F(P_foot/BC) (=−F(D_crus/BC)), the acceleration vector ACC(G_crus/BC) of the center of gravity of the crus element S12 found by the total/element center-of-gravity motion calculation means 32, and the weight m_crus of the crus element S12. Similarly, F(P_thigh/BC), namely, the translational force acting on the hip joint J_hip is found by the calculation of the right-hand side of the formula (25) by using the found F(P_crus/BC) (=F(D_thigh/BC)). In this manner, the reaction force-vectors (translational force vectors) acting on the joint elements J_ankle, J_knee, and J_hip are calculated in order on the basis of the equations of motion of the above (23) to (25).

Subsequently, the equations of motion of the rotary motions (rotary motions each around the center of gravity concerned) of the foot element S14, the crus element S12, and the thigh element S10 are given by the following formulas (26) to (28):

$$M(P\_foot/C\_foot) = I\_foot \times \omega(foot/C\_foot)' + \qquad (26)$$
$$\omega(foot/C\_foot) \times (I\_foot \times$$
$$\omega(foot/C\_foot)) - (U(COP/C\_foot) -$$
$$U(G\_foot/C\_foot)) \times$$
$$(R(BC \to C\_foot) \times F(D\_foot/BC)) -$$
$$(U(P\_foot/C\_foot) - U$$
$$(G\_foor/C\_foot)) \times (R(BC \to C\_foot) \times$$
$$(R(BC \to C\_foot) \times M(D\_foot/BC))$$

$$M(P\_crus/C\_crus) = I\_crus \times \omega(crus/C\_crus)' + \qquad (27)$$
$$\omega(crus/C\_crus) \times (I\_crus \times$$
$$\omega(crus/C\_crus)) -$$
$$(-U(G\_crus/C\_crus)) \times$$
$$(R(BC \to C\_crus) \times F(D\_crus/BC)) -$$
$$(U(P\_crus/C\_crus) -$$
$$U(G\_crus/C\_crus)) \times$$
$$(R(BC \to C\_crus) \times F(P\_crus/BC)) -$$
$$R(BC \to C\_crus) \times M(D\_crus/BC))$$

$$M(P\_thigh/C\_thigh) = I\_thigh \times \omega(thigh/C\_thigh)' + \qquad (28)$$
$$\omega(thigh/C\_thigh) \times (I\_thigh \times$$
$$\omega(thigh/C\_thigh)) - (-U(G\_thigh/$$
$$C\_thigh)) \times (R(BC \to C\_thigh) \times$$
$$F(D\_thigh/BC)) - (U(P\_thigh/$$
$$C\_thigh) - U(G\_thigh/C\_thigh)) \times$$
$$(R(BC \to C\_thigh) \times F(P\_thigh/$$
$$BC)) - R(BC \to C\_thigh) \times$$
$$M(D\_thigh/BC))$$

In the above, F(P_□□/BC) and F(D_□□/BC) appearing in the above formulas (26) to (28) denote respectively reaction force moments (the moment vectors in the body coordinate system BC) applied by an object put in contact with the ends of the rigid element whose name is represented by □□ to the ends thereof. In this case, M(D_foot/BC) of the formula (26) is zero. In addition, M(D_crus/BC)=−R(C_foot→BC)× M(P_foot/C_foot) and M(D_thigh/BC)=−R(C_crus→BC)× M(P_crus/C_crus). Moreover, I_foot, I_crus, and I_thigh are respectively moments of inertia around the corresponding center of gravity of the foot element S14, the crus element S12, and the thigh element S10. Furthermore, ω(foot/ C_foot), ω(crus/C_crus), and ω(thigh/C_thigh) respectively denote angular velocities around the corresponding center of gravity of the foot element S14, the crus element S12, and the thigh element S10. In this case, generally the moments of inertia I_foot, I_crus, and I_thigh are sufficiently small values (values close to zero), and therefore all of I_foot, I_crus, and I_thigh are approximate to zero in this embodiment.

Therefore, the formulas (26) to (28) can be approximately replaced with the formulas (29) to (31) described below. In the formulas (29) to (31), the following conditions are considered: M(D_foot/BC)=0; M(D_crus/BC)=−R (C_foot→BC)×M(P_foot/C_foot); and $$M(D\_thigh/BC) = -R(C\_crus \to BC) \times M(P\_crus/C\_crus). \qquad (29)$$
$$M(P\_crus/C\_crus) = (U(COP/C\_foot) - U(G\_foot/C\_foot)) \times$$
$$(R(BC \to C\_foot) \times F(D\_foot/BC)) -$$
$$(U(P\_foot/C\_foot) - U(G\_foot/C\_foot)) \times$$
$$(R(BC \to C\_foot) \times F(P\_foot/BC))$$

$$M(P\_crus/C\_crus) = -(-U(G\_crus/C\_crus)) \times \qquad (30)$$
$$(R(BC \to C\_crus) \times F(D\_crus/BC)) -$$
$$(U(P\_crus/C\_crus) - U(G\_crus/$$
$$C\_crus)) \times (R(BC \to C\_crus) \times$$
$$F(P\_crus/BC)) - R(BC \to C\_crus) \times$$
$$(-R(C\_foot \to BC) \times$$
$$M(P\_foot/C\_foot))$$

$$M(P\_thigh/C\_thigh) = -(-U(G\_thigh/C\_thigh)) \times \qquad (31)$$
$$(R(BC \to C\_thigh) \times F(D\_thigh/$$
$$BC)) - (U(P\_thigh/C\_thigh) -$$
$$U(G\_thigh/C\_thigh)) \times$$
$$(R(BC \to C\_thigh) \times F(P\_thigh/$$
$$BC)) - R(BC \to C\_thigh) \times$$
$$(-R(C\_crus \to BC) \times$$
$$M(P\_crus/C\_crus))$$

Then, in this embodiment, M(P_foot/C_foot), namely, the joint moment M(P_foot/C_foot) (the moment vector expressed in the foot coordinate system C_foot) acting on the ankle joint 13 is found by the calculation of the right-hand side of the formula (29). In this case, U(COP/C_foot) in the right-hand side of the formula (29) is found by multiplying the position vector U(COP/BC) of the floor reaction force acting point previously found by the floor reaction force acting point estimation means 34 by the inverse transformation tensor R(BC→C_foot)=R(C_foot→BC)$^T$ of the transformation tensor R(C_foot→BC) found by the transformation tensor generation means 28. Moreover, U(G_foot/ C_foot) has been previously set and U(P_foot/C_foot) is a position vector (0, 0, L14)$^T$ of the ankle joint J13 in the foot coordinate system C_foot, which is determined by the predetermined length L14 of the foot element S14. Moreover, F(D_foot/BC) is a value of the floor reaction force vector Frf(leg/BC) previously found by the floor reaction force estimation means 31. Still further, F(P_foot/BC) is found by the aforementioned formula (23) as described above. Therefore, M(P_foot/C_foot), namely, a joint moment acting on the ankle joint 13 (a moment vector expressed in the foot coordinate system C_foot) is found by the calculation of the right-hand side of the formula (29) by using the transformation tensor R(C_foot→BC) generated by the transformation tensor generation means 28, the position vector U(COP/BC) of the floor reaction force acting point found by the floor reaction force acting point estimation means 34, the floor reaction force vector Frf(leg/BC) found by the floor reaction force estimation means 33, and the reaction force vector F(P_foot/BC) found by the aforementioned formula (23). Regarding the leg 2 not landing, the position vector U(COP/ C_foot) of its floor reaction force acting point is indefinite. Since F(D_foot/BC)=0, however, the value of the first term of the formula (29) is zero independently of the value of U(COP/ C_foot).

Moreover, M(P_crus/C_crus), namely a joint moment acting on the knee joint 11 (a moment vector expressed in the crus coordinate system C_crus) is found by the calculation of the right-hand side of the formula (30). In this case, U(G_crus/C_crus)) on the right-hand side of the formula (30) is previously set, and U(P_crus/C_crus) is the position vector $(0, 0, L12)^T$ of the knee joint J11 in the crus coordinate system C_crus (C12), which is determined by the predetermined length L12 of the crus element S12. In addition, R(BC→C_crus) is an inverse transformation tensor R(C_crus→BC)$^T$ of the transformation tensor R(C_crus→BC) generated by the transformation tensor generation means 28. Moreover, F(D_crus/BC) is opposite in sign to F(P_foot/BC) found by the above formula (23), and F(P_crus/BC) is found by the above formula (24). Furthermore, M(P_foot/C_foot) is found by the above formula (29). Therefore, M(P_crus/C_crus), namely, the joint moment acting on the knee joint 11 (the moment vector expressed in the crus coordinate system C_crus) is found by the calculation of the right-hand side of the formula (30) by using the transformation tensors R(C_crus→BC) and R(C_foot→BC) generated by the transformation tensor generation means 28, reaction force vectors F(P_foot/BC) and F(P_crus/BC) previously found by the above formulas (23) and (24) respectively, the preset position vector U(G_crus/C_crus) of the center of gravity of the crus element S12, the length L12 of the crus element S12, and the moment M(P_foot/C_foot) previously found by the above formula (29).

Similarly, M(P_thigh/C_thigh), namely, a joint moment acting on the hip joint 9 (a moment vector expressed in the thigh coordinate system C_thigh) is found by the calculation of the right-hand side of the formula (31). In this case, U(G_thigh/C_thigh) on the right-hand side of the formula (31) is previously set, and U(P_thigh/C_thigh) is a position vector $(0, 0, L10)^T$ of the hip joint J9 in the thigh coordinate system C_thigh, which is determined by the predetermined length L10 of the thigh element S10. Moreover, R(BC→C_thigh) is an inverse transformation tensor R(C_thigh→BC)$^T$ of the transformation tensor R(C_thigh→BC) generated by the transformation tensor generation means 28. Furthermore, F(D_thigh/BC) is opposite in sign to F(P_crus/BC) found by the above formula (24), and F(P_thigh/BC) is found by the above formula (25). Moreover, M(P_crus/C_crus) is found by the above formula (30). Therefore, M(P_thigh/C_thigh), namely, the joint moment acting on the hip joint 9 (the moment vector expressed in the thigh coordinate system C_thigh) is found by the calculation of the right-hand side of the formula (31) by using the transformation tensors R(C_thigh→BC) and R(C_crus→BC) generated by the transformation tensor generation means 28, reaction force vectors F(P_crus/BC) and F(P_thigh/BC) previously found by the above formulas (24) and (25) respectively, the preset position vector U(G_thigh/C_thigh) of the center of gravity of the thigh element S10, the length L10 of the thigh element S10, and the moment M(P_crus/C_crus) previously found by the above formula (30).

As described hereinabove, in the arithmetic processing of the joint moment estimation means 35, the joint moments M(P_foot/C_foot), M(P_crus/C_crus), and M(P_thigh/C_thigh) of the ankle joint 13, the knee joint 11, and the hip joint 9 of the each leg 2 are calculated in order from the ankle joint 13 side. The joint moments found as described above are for use in controlling, for example, an apparatus for assisting walking of the human being 1 (an apparatus including an electric motor capable of applying an auxiliary torque to the ankle joint 13, the knee joint 11, or the hip joint 9).

In the embodiment described hereinabove, various types of arithmetic processing are performed by using the body coordinate system BC as a basic coordinate system. Moreover, arithmetic processing performed in consideration of a tilt angle to the body coordinate system BC or to the vertical direction of the waist 6 is performed only in the case of the floor reaction force acting point estimation means 32. Therefore, arithmetic processing using a tilt angle of the waist 6 or the like to the vertical direction can be greatly reduced in comparison with the conventional technology. As a result, even if it is hard to grasp a tilt angle with high accuracy, the accumulation of errors can be minimized, thereby achieving an increase in the estimation accuracy of the joint moments. Moreover, by using the floor reaction force acting point estimation means without using a tilt angle, a three-dimensional posture sensor becomes unnecessary for the joint moment estimation system, thereby enabling downsizing and simplification of the system.

In addition, in this embodiment, processes of the respective means of the arithmetic processing unit 18 are performed in three dimensions, thus enabling an increase in the accuracy of joint moments to be estimated.

INDUSTRIAL APPLICABILITY

As described hereinabove, the present invention enables estimating the joint moments of the legs of the two-legged walking mobile body appropriately, and therefore it can be effectively used for an apparatus assisting walking of a human being or the like.

The invention claimed is:

1. A joint moment estimation method for a two-legged walking mobile body, for estimating a joint moment acting on at least one joint of each leg of the two-legged walking mobile body by using a rigid link model in which the two-legged walking mobile body is represented as a link body where a plurality of rigid elements are coupled together by a plurality of joint elements including at least joint elements corresponding to a hip joint and a knee joint of each leg of the two-legged walking mobile body, the method comprising:
   a first step of sequentially grasping displacements of the respective joints of the two-legged walking mobile body corresponding to the respective joint elements of the rigid link model;
   a second step of sequentially grasping values in a body coordinate system of an acceleration vector of the origin of the body coordinate system, which has been preset as a coordinate system fixed to and tilting with one predetermined rigid element of the rigid link model, by using at least an output of an acceleration sensor attached to the two-legged walking mobile body;
   a third step of sequentially grasping values in the body coordinate system of a floor reaction force vector acting on each leg of the two-legged walking mobile body;
   a fourth step of sequentially grasping values in the body coordinate system of a position vector of a point of application of the floor reaction force vector; and
   a fifth step of sequentially estimating joint moments acting on at least one joint of each leg of the two-legged walking mobile body on the basis of an inverse dynamics model representing a relation between a motion of each rigid element of the rigid link model and a translational force and moment acting on the rigid element in the body coordinate system by using the displacements of the respective joints of the two-legged walking mobile body grasped in the first to fourth steps, the value of the acceleration vector of the origin in the body coordinate system, the value of the floor reaction force vector, and the value of the position vector of the point of application of the floor reaction force vector.

2. The joint moment estimation method for the two-legged walking mobile body according to claim 1, wherein the acceleration sensor is attached to a rigid equivalent part of the two-legged walking mobile body corresponding to the rigid element to which the body coordinate system is fixed.

3. The joint moment estimation method for the two-legged walking mobile body according to claim 2, wherein the rigid element to which the body coordinate system is fixed is a rigid element connecting a pair of joint elements corresponding to a pair of hip joints of the two-legged walking mobile body.

4. The joint moment estimation method for the two-legged walking mobile body according to claim 1, further comprising:
   a sixth step of sequentially calculating values in the body coordinate system of a position vector of an total center-of-gravity of the two-legged walking mobile body by using the displacements of the respective joints of the two-legged walking mobile body grasped in the first step and the rigid link model;
   a seventh step of sequentially grasping values in the body coordinate system of the acceleration vector of the total center-of-gravity from time-series data of the value of the position vector of the total center-of-gravity and the value of the acceleration vector of the origin of the body coordinate system grasped in the second step; and
   an eighth step of sequentially determining whether the motion state of the two-legged walking mobile body is a one-leg supporting state in which only one leg of a pair of legs is landing or a two-leg supporting state in which both legs are landing,
   wherein the third step includes: estimating the value in the body coordinate system of the floor reaction force vector on the basis of the equation of motion of the total center-of-gravity of the two-legged walking mobile body represented by the value of the acceleration vector of the total center-of-gravity calculated in the seventh step, the total weight of the two-legged walking mobile body, and the floor reaction force vector acting on the landing leg if the motion state of the two-legged walking mobile body is the one-leg supporting state; and grasping the values in the body coordinate system of the floor reaction force vectors acting on both legs respectively on the basis of the equation of motion of the total center-of-gravity of the two-legged walking mobile body represented by the value of the acceleration vector of the total center-of-gravity calculated in the seventh step, the total weight of the two-legged walking mobile body, and the floor reaction force vectors acting on the both legs respectively and a relational expression between a relative position of a specific portion of each of the legs to the total center-of-gravity of the two-legged walking mobile body, which is determined on the assumption that the floor reaction force vector acting on the leg is a vector acting from the specific portion predetermined in the vicinity of the lower end of the leg toward the total center-of-gravity of the two-legged walking mobile body, and the floor reaction force vector acting on the leg if the motion state of the two-legged walking mobile body is the two-leg supporting state.

5. The joint moment estimation method for the two-legged walking mobile body according to claim 1, further comprising:
   a ninth step of sequentially grasping tilt angles to the vertical direction of the rigid equivalent part of the two-legged walking mobile body corresponding to the rigid element to which the body coordinate system is fixed;
   a tenth step of determining whether or not the leg is landing for each of the legs of the two-legged walking mobile body;
   an 11th step of grasping at least a value in the body coordinate system of the position vector of the total center-of-gravity of the two-legged walking mobile body, a value in the body coordinate system of the position vector of the ankle joint of the landing leg, and a value in the body coordinate system of the position vector of a metatarsophalangeal joint of the foot of the leg by using the displacements of the respective joints of the two-legged walking mobile body grasped in the first step and the rigid link model;
   a 12th step of grasping at least the positional relationship among the total center-of-gravity, the ankle joint of the landing leg, and the metatarsophalangeal joint of the foot of the leg and the vertical position of the ankle joint of the leg on the basis of the position vector values of the total center-of-gravity, the ankle joint of the landing leg, and the metatarsophalangeal joint of the foot of the leg having been grasped and the tilt angle grasped in the ninth step; and
   a 13th step of estimating a horizontal in-plane position of the point of application of the floor reaction force vector acting on the landing leg on the basis of the grasped positional relationship among the total center-of-gravity, the ankle joint of the landing leg, and the metatarsophalangeal joint of the foot of the leg and estimating the vertical position of the point of application of the floor reaction force vector acting on the leg on the basis of the vertical position of the ankle joint of the leg,
   wherein the fourth step includes a step of grasping a value of the position vector of the point of application of the floor reaction force vector in the body coordinate system on the basis of the horizontal in-plane position and the vertical position of the point of application of the floor reaction force vector estimated in the 13th step and the tilt angle grasped in the ninth step.

6. The joint moment estimation method for the two-legged walking mobile body according to claim 5, wherein:
   the values of the floor reaction force vector and the position vector of the point of application of the floor reaction force vector grasped in the third step and the fourth step, respectively, are three-dimensional values; and
   the 13th step includes a step of: estimating the horizontal in-plane position of the ankle joint of the landing leg as the horizontal in-plane position of the point of application of the floor reaction force vector acting on the leg if the total center-of-gravity is more backward than the ankle joint of the landing leg in the forward/backward direction of the two-legged walking mobile body; estimating the horizontal in-plane position of the metatarsophalangeal joint of the foot of the landing leg as the horizontal in-plane position of the point of application of the floor reaction force vector acting on the leg if the total center-of-gravity is more forward than the metatarsophalangeal joint of the foot of the landing leg in the forward/backward direction of the two-legged walking mobile body; and estimating the horizontal in-plane position of the point whose position in the forward/backward is coincident with the total center-of-gravity on the line segment connecting the ankle joint with the metatarsophalangeal joint of the landing leg as a horizontal in-plane position of the point of application of the floor reaction force vector acting on the leg if the total center-of-gravity is more forward than the ankle joint of the landing leg in the forward/backward direction of the two-legged walking mobile body and is more backward than the metatarsophalangeal joint of the foot of the leg.

7. The joint moment estimation method for the two-legged walking mobile body according to claim 5, wherein the 13th step includes a step of estimating the vertical position of the point of application of the floor reaction force vector acting on the landing leg as a position located a predetermined value apart from the vertical position of the ankle joint of the leg grasped in the 12th step downward in the vertical direction.

8. The joint moment estimation method for the two-legged walking mobile body according to claim 7, wherein:
   the 10th step includes a step of determining whether each of the toe-side portion and the heel-side portion of the foot of the leg is in contact with the ground regarding the leg determined to be landing;
   the 12th step includes a step of grasping the vertical position of the metatarsophalangeal joint of the foot of the leg in addition to the vertical position of the ankle joint of the landing leg; and
   the 13th step includes a step of estimating the vertical position of the point of application of the floor reaction force vector by using a distance in the vertical direction between the ankle joint and the metatarsophalangeal joint obtained from the vertical position of the ankle joint and the vertical position of the metatarsophalangeal joint grasped in the 12th step, instead of the predetermined value, if only the toe-side portion is determined to be in contact with the ground among the toe-side portion and the heel-side portion of the foot in the 10th step.

9. The joint moment estimation method for the two-legged walking mobile body according to claim 1, wherein the value of the floor reaction force vector and the value of the position vector of the point of application of the floor reaction force vector respectively grasped in the third step and the fourth step are three-dimensional values.

10. The joint moment estimation method for the two-legged walking mobile body according to claim 6, wherein the 13th step includes a step of estimating the vertical position of the point of application of the floor reaction force vector acting on the landing leg as a position located a predetermined value apart from the vertical position of the ankle joint of the leg grasped in the 12th step downward in the vertical direction.

11. The joint moment estimation method for the two-legged walking mobile body according to claim 10, wherein:
   the 10th step includes a step of determining whether each of the toe-side portion and the heel-side portion of the foot of the leg is in contact with the ground regarding the leg determined to be landing;
   the 12th step includes a step of grasping the vertical position of the metatarsophalangeal joint of the foot of the leg in addition to the vertical position of the ankle joint of the landing leg; and
   the 13th step includes a step of estimating the vertical position of the point of application of the floor reaction force vector by using a distance in the vertical direction between the ankle joint and the metatarsophalangeal joint obtained from the vertical position of the ankle joint and the vertical position of the metatarsophalangeal joint grasped in the 12th step, instead of the predetermined value, if only the toe-side portion is determined to be in contact with the ground among the toe-side portion and the heel-side portion of the foot in the 10th step.

12. The joint moment estimation method for the two-legged walking mobile body according to claim 4, wherein the value of the floor reaction force vector and the value of the position vector of the point of application of the floor reaction force vector respectively grasped in the third step and the fourth step are three-dimensional values.

13. The joint moment estimation method for the two-legged walking mobile body according to claim 5, wherein the value of the floor reaction force vector and the value of the position vector of the point of application of the floor reaction force vector respectively grasped in the third step and the fourth step are three-dimensional values.

\* \* \* \* \*

UNITED STATES PATENT AND TRADEMARK OFFICE
CERTIFICATE OF CORRECTION

PATENT NO. : 7,698,020 B2  
APPLICATION NO. : 10/564069  
DATED : April 13, 2010  
INVENTOR(S) : Kawai et al.

Page 1 of 1

It is certified that error appears in the above-identified patent and that said Letters Patent is hereby corrected as shown below:

In Column 35, Line 13, in Claim 4, delete "an" and insert -- the --.

Signed and Sealed this

Twenty-second Day of June, 2010

David J. Kappos  
*Director of the United States Patent and Trademark Office*